United States Patent
Soares et al.

(10) Patent No.: US 12,091,569 B2
(45) Date of Patent: Sep. 17, 2024

(54) ETHYLENE-VINYL ESTER POLYMERS FOR ADDITIVE-MANUFACTURE FEEDSTOCK

(71) Applicant: BRASKEM AMERICA, INC., Philadelphia, PA (US)

(72) Inventors: Juliana Breda Soares, Pittsburgh, PA (US); Jacob Fallon, Pittsburgh, PA (US); Dillan Passos Bernardes, Pittsburgh, PA (US); Mauro Alfredo Soto Oviedo, Pittsburgh, PA (US); Nei Sebastião Domingues, Jr., Pittsburgh, PA (US); Manoela Ellwanger Cangussu, Pittsburgh, PA (US); Michelle K. Sing, Pittsburgh, PA (US); Jorge Manuel Jardim Da Silva, Pittsburgh, PA (US)

(73) Assignee: BRASKEM AMERICA, INC., Philadelphia, PA (US)

( * ) Notice: Subject to any disclaimer, the term of this patent is extended or adjusted under 35 U.S.C. 154(b) by 0 days.

(21) Appl. No.: 17/744,486

(22) Filed: May 13, 2022

(65) Prior Publication Data
US 2022/0389262 A1 Dec. 8, 2022

Related U.S. Application Data

(60) Provisional application No. 63/188,933, filed on May 14, 2021.

(51) Int. Cl.
| | |
|---|---|
| C09D 123/08 | (2006.01) |
| B29C 64/118 | (2017.01) |
| B33Y 10/00 | (2015.01) |
| B33Y 70/10 | (2020.01) |
| C08F 210/02 | (2006.01) |
| B29K 23/00 | (2006.01) |
| B29K 105/16 | (2006.01) |

(52) U.S. Cl.
CPC ...... *C09D 123/0853* (2013.01); *B29C 64/118* (2017.08); *B33Y 10/00* (2014.12); *B33Y 70/10* (2020.01); *C08F 210/02* (2013.01); *B29K 2023/083* (2013.01); *B29K 2105/16* (2013.01); *C08F 2800/20* (2013.01)

(58) Field of Classification Search
None
See application file for complete search history.

(56) References Cited

U.S. PATENT DOCUMENTS

| | | | |
|---|---|---|---|
| 2005/0113540 A1* | 5/2005 | Weaver | C08F 210/02 526/308 |
| 2009/0312454 A1 | 12/2009 | Leuterer et al. | |
| 2016/0069001 A1 | 3/2016 | Kim et al. | |
| 2016/0237271 A1* | 8/2016 | Koehnke | B29C 39/003 |
| 2016/0297103 A1 | 10/2016 | Lee | |
| 2019/0315949 A1* | 10/2019 | Delevati | C08G 77/04 |
| 2019/0382566 A1* | 12/2019 | Delevati | C08J 3/226 |
| 2020/0032062 A1* | 1/2020 | Wallin | B33Y 10/00 |
| 2020/0325323 A1 | 10/2020 | Liu et al. | |

FOREIGN PATENT DOCUMENTS

| | | | | |
|---|---|---|---|---|
| CN | 106700357 A | 5/2017 | | |
| CN | 108164787 A | 6/2018 | | |
| CN | 109206866 A | 1/2019 | | |
| EP | 3247327 B1 | 8/2019 | | |
| JP | 2016-537460 A | 12/2016 | | |
| WO | WO-2020099484 A1 * | 5/2020 | | B22F 1/0059 |

OTHER PUBLICATIONS

Gorjan et al., "Effect of stearic acid on rheological properties and printability of ethylene vinyl acetate based feedstocks for fused filament fabrication of alumina," Additive Manufacturing 36: 1-9 (2020).

Kumar et al., "3D Printing of Flexible Parts Using EVA Material," Materials Physics and Mechanics 37: 124-132 (2018).

Genina et al., "Ethylene vinyl acetate (EVA) as a new drug carrier for 3D printed medical drug delivery devices," European Journal Pharmaceutical Sciences 90: 53-63 (2016).

Kumar et al., "The effect of process parameters on tensile behavior 3D printed flexible parts of ethylene vinyl acetate (EVA)," Journal of Manufacturing Processes 35: 317-326 (2018).

Kumar et al., "Experimental investigations on suitability of polypropylene (PP) and ethylene vinyl acetate (EVA) in additive manufacturing," Materials Today: Proceedings 5: 4118-4127 (2018).

* cited by examiner

*Primary Examiner* — Mohammad M Ameen
(74) *Attorney, Agent, or Firm* — Jeffrey N. Townes; Cozen O'Connor

(57) ABSTRACT

The invention relates to an additive-manufacture feedstock, comprising an ethylene-vinyl ester polymer having a melt flow rate of from 0.1 to 150 g/10 min (190° C./2.16 kg), measured according to ASTM D 1238, and a vinyl ester content of from about 1.0 wt % to about 30 wt %, wherein the ethylene-vinyl ester polymer exhibits a Shore A hardness of at least about 60. The pellets and filaments produced from the additive-manufacture feedstock have a high degree of printability in material-extrusion-based 3D printing technology, and can be used to produce 3D printing articles with a high consistency to the targeted 3D model and substantially no warpage. The invention also relates to methods of making the additive-manufacture feedstock and methods of 3D printing using the additive-manufacture feedstock in various forms.

30 Claims, 14 Drawing Sheets

ANY LOCATION AS DESIGNATED BY ONE OF THE THREE SYMBOLS BELOW THAT HAS MATERIAL IN IT COUNTS AS ONE SPOT.

ETHYLENE-VINYL ESTER POLYMERS FOR ADDITIVE-MANUFACTURE FEEDSTOCK

This application claims the benefit of priority to U.S. Provisional Patent Application No. 63/188,933, filed on May 14, 2021, which is herein incorporated by reference in its entirety.

FIELD OF THE INVENTION

This invention generally relates to an additive-manufacture feedstock comprising an ethylene-vinyl ester polymer for 3D printing.

BACKGROUND OF THE INVENTION 3D printing of polymer materials typically employs fused filament fabrication technology (FFF) (also known as fused deposition modelling, FDM) or fused particle fabrication (FPF) (also known as fused granular fabrication, FGF). The technology involves melting or softening the polymer materials, in the forms of filaments or pellets, to produce polymer strands. The polymer strands are deposited and arranged, layer by layer, onto a substrate that is often cooler in temperature than the melted or softened polymer strands. This differential temperature combined with the temperature of the environment contribute to cooling the deposited polymer from a molten state to a solid state to obtain a 3D printed polymer object.

Originally, a majority of polymer materials for these 3D printing technologies were amorphous materials, such as acrylonitrile butadiene styrene (ABS) filament, an amorphous polymer. More recently, semi-crystalline polymers have become of an interest to the 3D printing industry. However, 3D printing of crystalline or semi-crystalline polymers has been challenging. For semi-crystalline polymers, the thermal gradients induce crystallization as the material cools down and subsequently shrinks in volume. As the printing process continues in a layer-by-layer fashion, variation in thermal history, and thus material volume between each of the additively manufactured layers, results in the development of internal stresses within the printed part. These stresses result in the deformation of the layers, which can cause not only poor dimensional accuracy but also failures of building, e.g., between the deposited layers and the printer bed and/or between subsequent layers of a printed part. The low polarity of the semi-crystalline polyolefins can also result in poor adhesion to the 3D printer bed, causing an unsuccessful printing process.

To solve these aforementioned problems, some efforts have been made to use ethylene copolymers that contain an amorphous content, such as vinyl acetate. The amorphous vinyl acetate content introduced into the semi-crystalline polyethylene structure can reduce the stereoregularity of the macromolecule and restrict crystallization. A higher vinyl acetate content can also increase polarity to facilitate adhesion to the 3D printer bed. However, these efforts been made mostly on the pellet-based 3D printing technology.

Although FFF (or FDM) is widely popular due to its capability of fabricating intricate geometries, it is primarily based on a filament-feed extrusion mechanism using filaments of thermoplastic materials. Filament-based 3D printing technology can present limitations on fabricating flexible parts of soft-elastomers, due to lack of piston effect from filaments produced from soft-elastomers. This can cause printing issues, such as buckling issues, resulting in printing failures. For instance, as discussed above, increasing vinyl acetate content can reduce the crystallization and increase polarity of the polyethylene polymer, but, at the same time, it can also reduce the hardness that may be required for the filament to successfully print on a FFF 3D printer.

Because of these aforementioned challenges in 3D printing to fabricate flexible parts of soft-elastomers based on polyolefin copolymers, in particularly filament-based 3D printing technology, currently available polyethylene copolymer materials on the market often lack the printability and processability required in a 3D printing technology based on a filament-feed extrusion mechanism. There thus remains a need in the art to develop a polyethylene-vinyl ester copolymer based additive-manufacture feedstock as a feasible 3D printing feedstock that provides a high degree of printability particularly for a 3D printing technology based on a filament-feed extrusion mechanism.

SUMMARY OF THE INVENTION

One aspect of the invention relates to an additive-manufacture feedstock, comprising an ethylene-vinyl ester polymer having a melt flow rate of from 0.1 to 150 g/10 min (190° C./2.16 kg), measured according to ASTM D 1238, and a vinyl ester content of from 1.0 to 30 wt %, relative to 100 wt % of the ethylene-vinyl ester polymer. The ethylene-vinyl ester polymer exhibits a Shore A hardness of at least 60.

Another aspect of the invention relates to a filament formed from the additive-manufacture feedstock as described from the above aspect of the invention.

Another aspect of the invention relates to a distribution (or a suspension) of pellets, each pellet formed from the additive-manufacture feedstock as described from the above aspect of the invention.

Another aspect of the invention relates to a method of making an additive-manufacture feedstock. The method comprises polymerizing an ethylene comonomer and one or more vinyl ester comonomers to form an ethylene-vinyl ester polymer. The formed ethylene-vinyl ester polymer has a melt flow rate of from 0.1 to 150 g/10 min (190° C./2.16 kg), measured according to ASTM D 1238, a vinyl ester content of from 1.0 to 30 wt %, relative to 100 wt % of the ethylene-vinyl ester polymer, and a Shore A hardness of at least 60.

Another aspect of the invention relates to a method of three-dimensional printing. The method comprises: (1) supplying the additive-manufacture feedstock as described from the above aspect of the invention to a printing apparatus and forming a hot-melt of the additive-manufacture feedstock; (2) depositing the hot-melt of the additive-manufacture feedstock from the printing apparatus on a substrate to form a first deposited printing layer; (3) repeating (1) and (2) to deposit a second printing layer on the first printing layer; and (4) optionally depositing at least one further printing layer on said second printing layer.

Additional aspects, advantages and features of the invention are set forth in this specification, and in part will become apparent to those skilled in the art on examination of the following, or may be learned by practice of the invention. The inventions disclosed in this application are not limited to any particular set of or combination of aspects, advantages and features. It is contemplated that various combinations of the stated aspects, advantages and features make up the inventions disclosed in this application.

BRIEF DESCRIPTION OF THE DRAWINGS

FIG. 1 also shows and compares the results of the filament production tests (the first line of check marks and cross marks) and the Fused Filament Fabrication (FFF) 3D printing tests (the second line of check marks and cross marks) for these five different feedstock. A check mark indicates that the polymer sample successfully passed the test; whereas a cross mark indicates that the polymer sample did not successfully pass the test and caused issues during filament production test/FFF 3D printing test.

FIG. 2 also shows and compares the results of the Fused Filament Fabrication (FFF) 3D printing tests (check marks and cross marks) for these five different feedstock. A check mark indicates that the polymer sample successfully passed the test; whereas a cross mark indicates that the polymer sample did not successfully pass the test and caused issues during FFF 3D printing test. The arrow extended from EVA 4 sample points to three 3D articles printed with the filament produced from EVA 4 sample, and the arrow extended from EVA 5 sample points to three 3D articles printed with the filament produced from EVA 5 sample. The 3D articles printed from EVA 4 and EVA 5 are placed side by side, with each of the two articles in the same row being based on the same targeted 3D model. The printed objects show a high degree of complexity, demonstrating a high degree of printability of the inventive additive-manufacture feedstock for 3D printing of a complex part.

DETAILED DESCRIPTION OF THE INVENTION

Figure 1:
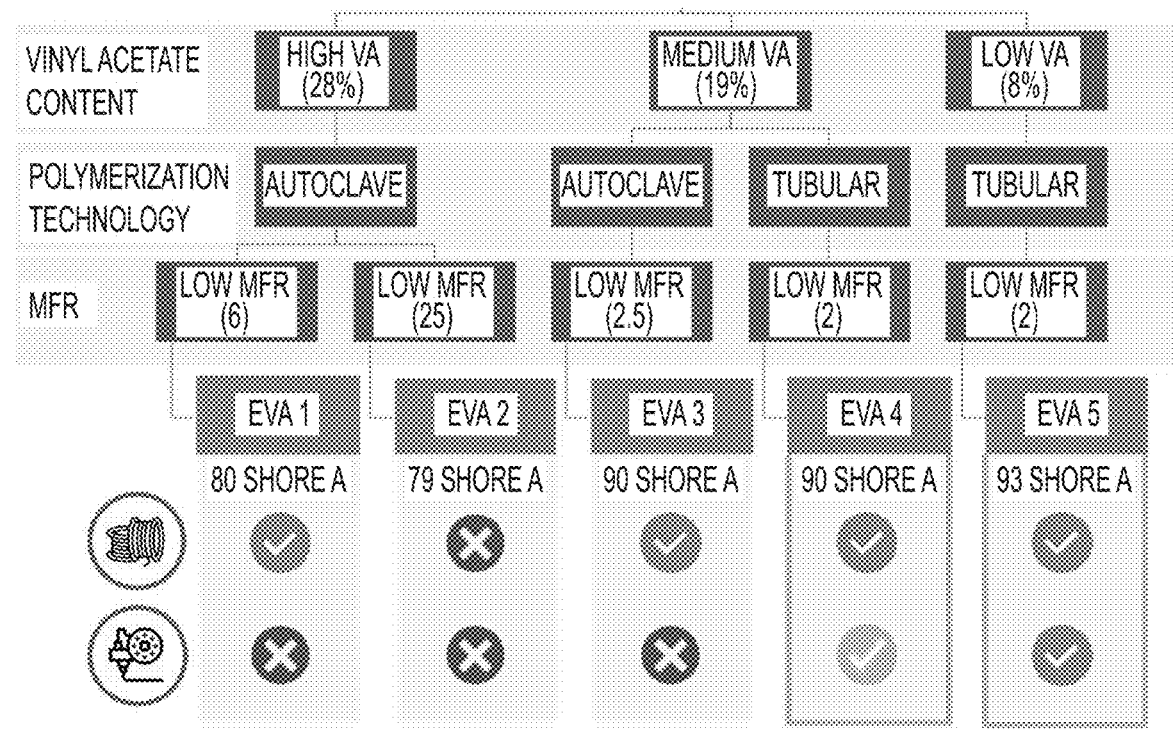
FIG. 1 shows the exemplary additive-manufacture feedstock used in Example 1, illustrating five different ethylene-vinyl acetate (EVA) copolymer samples, EVA 1, EVA 2, EVA 3, EVA 4, and EVA 5, and their respective vinyl acetate content, polymerization technology, melt flow rate (MFR), and Shore A hardness.

The disclosure provides an additive-manufacture feedstock comprising an ethylene-vinyl ester polymer (e.g., an ethylene-vinyl acetate copolymer) that balances the vinyl ester content, the melt flow rate (melt viscosity), elastic modulus, hardness, and polymer architecture to produce a feedstock material that has a high degree of printability in material-extrusion-based 3D printing technology, such as FFF and FPF. In particular, the filaments produced from the additive-manufacture feedstock provide desirable piston effects for extrusion at 3D printer nozzle, and can result in 3D printed articles with a high consistency to the targeted 3D model with a high dimensional accuracy, substantially no warpage, good layer adhesion, and satisfactory bed adhesion.

Components for Additive-Manufacture Feedstock

One aspect of the invention relates to an additive-manufacture feedstock, comprising an ethylene-vinyl ester polymer having a melt flow rate of from about 0.1 g/10 min to about 150 g/10 min, measured according to ASTM D 1238 (190° C./2.16 kg), and a vinyl ester content of from about 1.0 wt % to about 30 wt %, relative to 100 wt % of the ethylene-vinyl ester polymer. The ethylene-vinyl ester polymer exhibits a Shore A hardness of at least about 60.

The ethylene-vinyl ester polymer used may be any polymer that includes an ethylene comonomer and one or more vinyl ester comonomers.

Suitable vinyl ester comonomers include aliphatic vinyl esters having 3 to 20 carbon atoms (e.g., 4 to 10 carbon atoms or 4 to 7 carbon atoms). Exemplary vinyl esters are vinyl acetate, vinyl formate, vinyl propionate, vinyl valerate, vinyl butyrate, vinyl isobutyrate, vinyl pivalate, vinyl caprate, vinyl laurate, vinyl stearate, and vinyl versatate. Aromatic vinyl esters such as vinyl benzonate can also be used as vinyl ester comonomers. These vinyl ester comonomers can be used alone or in combination of two or more different ones.

Common vinyl ester comonomers are vinyl acetate or vinyl versatate (e.g., the vinyl ester of versatic acid, vinyl neononanoate, or vinyl neodecanoate). Typically, vinyl acetate is used from the perspective of good commercial availability and impurity-treating efficiency at the production. The vinyl esters of neononanoic acid (vinyl neononanoate) and neodecanoic acid (vinyl neodecanoate) are commercial products obtained from the reaction of acetylene with neononanoic acids and neodecanoic acids, respectively, which are commercially available as Versatic acid 9 and Versatic acid 10.

Polymerization of ethylene comonomer and one or more vinyl ester comonomers can be carried out by known processes, in the presence of initiators, such as oxygen, peroxides, hydroperoxides, or azo compounds. The reaction of the monomers may be carried out under pressures between about 50 MPa and about 700 MPa (e.g., from about 150 MPa to about 300 MPa) and temperatures between about 100° C. and about 350° C. (e.g., between about 120° C. and about 325° C.). The polymerization can be carried out solvent free. Alternatively, the reaction mixture can contain solvents, such as aliphatic hydrocarbons, hydrocarbon mixtures, benzene, or toluene.

The polymerization may be carried out in known high-pressure reactors, for example in autoclaves reactors or tube reactors, using known reaction conditions suitable for the respective reactors.

In some embodiments, an autoclave-reactor polymerization is used for preparing the ethylene-vinyl acetate polymer to promote the formation of a more long-chain branched architecture.

In one embodiment, the ethylene-vinyl ester polymer used herein has a branched, or a long-chain branched architecture.

In some embodiments, a tubular-reactor polymerization is used for preparing the ethylene-vinyl acetate polymer to promote the formation of a more linear backbone configuration (as compared to a more branched or star configuration). In certain embodiments, the structure of the resulting ethylene-vinyl acetate polymer is substantially linear. For instance, at least 50%, at least 60%, at least 70%, at least 80%, at least 90%, at least 95%, or at least 99%, or virtually 100% of the resulting ethylene-vinyl acetate polymer has linear backbone configuration and is free of branching. Chain transfer agents and chain terminating transfer agents may be used, e.g., propionaldehyde, to further promote the formation of a more linear polymer. Suitable chain-transfer agents and chain-terminating transfer agents may be found in U.S. Pat. No. 6,596,241, which is herein incorporated by reference in its entirety.

In one embodiment, the ethylene-vinyl ester polymer used herein has a linear backbone configuration.

In some embodiments, the ethylene-vinyl ester polymer is an ethylene-vinyl acetate polymer or an ethylene-vinyl acetate-vinyl versatate terpolymer.

In one embodiment, the ethylene-vinyl ester polymer is a tubular-reactor-polymerized ethylene-vinyl acetate polymer or a tubular-reactor-polymerized ethylene-vinyl acetate-vinyl versatate terpolymer.

In one embodiment, the ethylene-vinyl ester polymer is an autoclave-reactor-polymerized ethylene-vinyl acetate polymer or an autoclave-reactor-polymerized ethylene-vinyl acetate-vinyl versatate terpolymer.

The vinyl ester content in the ethylene-vinyl ester polymer can range from about 1.0 wt % to about 50 wt %, relative to 100 wt % of the ethylene-vinyl ester polymer, with the remainder being the ethylene content. The vinyl ester content can reduce the stereoregularity of the macromolecule and restrict crystallization. The interlayer's adhesion is important for succeeding in additive manufacturing processes, and it is ruled by molecular diffusion in the layers' interface by the reputation of an amorphous phase. Thus, increasing the vinyl ester content would also increase molecular polarity, which will facilitate adhesion to the printer head. A less crystalline phase would reduce specific volume reduction while the polymer is cooling down and reduce shrinkage and the possibility of warpage. However, increasing the vinyl ester content can reduce the hardness that may be required for the filament to successfully print on a FFF 3D printer. Therefore, the vinyl ester content needs to be carefully chosen and balanced with other properties of the ethylene-vinyl ester polymer, such as the melt flow rate (melt viscosity), elastic modulus, hardness, and polymer architecture, to produce a feedstock material that has a high degree of printability in material-extrusion-based 3D printing technology.

Typically, the vinyl ester content is in the range of from about 5.0 wt % to about 50 wt %, from about 1.0 wt % to about 35 wt %, from about 1.0 wt % to about 30 wt %, from 5.0 wt % to about 30 wt %, from about 5.5 wt % to 28 wt %, from about 8.0 wt % to 28 wt %, from about 5.5 wt % to about 20 wt %, and from about 8.0 wt % to about 19 wt %, relative to 100 wt % of the ethylene-vinyl ester polymer.

In certain embodiments, the vinyl ester of the ethylene-vinyl ester polymer is vinyl acetate, and the ethylene-vinyl ester polymer is ethylene-vinyl acetate copolymer (EVA). EVA copolymer is also known as poly (ethylene-vinyl acetate) (PEVA), and may have the following structure:

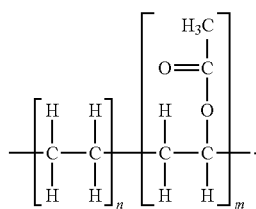

There are three main types of EVA copolymers, each of which has different vinyl acetate (VA) content, which in turn dictates the way the materials are used. Low-VA (approximately up to 4%) EVA is typically referred to as a vinyl-acetate modified polyethylene. Low-VA EVA is processed as low-density polyethylene and has properties similar to a LDPE but has increased gloss, softness, and flexibility. Medium-VA (approximately 4-30%) EVA, typically being referred to as a thermoplastic ethylene-vinyl acetate copolymer, is a thermoplastic elastomer material. Medium-VA EVA is processed as thermoplastic materials. EVAs with approximately 11% VA are typically used as hot melt adhesives. High-VA (greater than 33%) EVA is typically used as ethylene-vinyl acetate rubber. All these three types of EVA copolymers are suitable to be used herein. Both unfilled- and filled- (e.g., with inorganic fillers as discussed herein) EVA materials have good low temperature properties and are mechanically tough materials.

The VA content in the EVA copolymer can range from about 1.0 wt % to about 50 wt %, relative to 100 wt % of the EVA copolymer. As discussed above, the vinyl acetate content needs to be carefully chosen and balanced with other properties of the EVA copolymer, such as the melt flow rate (melt viscosity), elastic modulus, hardness, and polymer architecture. Typically, the VA content in the EVA copolymer can range from about 1.0 wt % to about 35 wt %, from 5.0 wt % to about 30 wt %, from about 5.5 wt % to 28 wt %, from about 8.0 wt % to 28 wt %, from about 5.5 to about 20 wt %, and from about 8.0 wt % to about 19 wt %.

The carbon content of the ethylene-vinyl ester polymer may be from a fossil source or from a green source (i.e., bio-based source). The term "bio-based" as used herein refers to a material that has a fraction of its carbon content sourced from biological materials or agricultural resources, rather than from fossil carbon resources.

The bio-based carbon content of the ethylene-vinyl ester polymer (e.g., an EVA copolymer) is typically from the ethylene component. The bio-based ethylene (or renewable ethylene) is typically made from ethanol, which becomes ethylene after a dehydration process. Ethanol can be produced from any plant-based materials. For instance, ethanol can be produced by fermenting starch or sugar from various bio-based feedstock, including but not limited to, corn, sugar cane, sugar beet, wheat grain, etc. Ethanol can also be produced from enzymatically decomposing various cellulosic feedstock, such as grasses, wood, algae, or other plants.

Using the bio-based ethylene in the ethylene-vinyl ester polymer has many advantages. One benefit is that the so-produced ethylene-vinyl ester polymer is green and environment friendly. For instance, per ton of green polyethylene produced, roughly 2.15 ton of $CO_2$ can be sequestrated which comes from the $CO_2$ absorbed by the sugar cane while growing, minus the $CO_2$ emitted through the production process. The bio-based ethylene in the ethylene-vinyl ester polymer can also be recycled in the same waste streams as traditional polyethylenes.

The ethylene-vinyl ester polymer can have a bio-based carbon content of from about 1% to about 100%. The use of bio-based ethylene in the ethylene-vinyl ester polymer can produce ethylene-vinyl ester polymers with a very high bio-based carbon content. For instance, the ethylene-vinyl ester polymer (e.g., an EVA copolymer) can have a bio-based carbon content of at least 10%, at least 20%, at least 30%, at least 40%, at least 50%, at least 60%, at least 70%, at least 80%, at least 90%, or virtually 100%. The bio-based carbon content of the ethylene-vinyl ester polymer can be tested by methods known to one skilled in the art. For instance, the ethylene-vinyl ester polymer (e.g., an EVA copolymer) can be analytically tested for $^{14}C$. The bio-based carbon content can be measured following the procedures set by ASTM D6866.

The ethylene-vinyl ester polymer has a melt flow rate of from about 0.1 g/10 min to about 150 g/10 min, from about 0.1 g/10 min to about 100 g/10 min, from about 0.1 g/10 min to about 50 g/10 min, from about 0.1 to about 40 g/10 min, from about 0.1 g/10 min to about 30 g/10 min, from about 0.1 g/10 min to about 24 g/10 min, from about 0.1 g/10 min to about 20 g/10 min, from about 1 g/10 min to about 24 g/10 min, from about 1 g/10 min to about 20 g/10 min, from about 2 g/10 min to about 24 g/10 min, from about 2 g/10 min to about 20 g/10 min, from about 1 g/10 min to about 10 g/10 min, from about 2 g/10 min to about 10 g/10 min, or from about 2 g/10 min to about 6 g/10 min. The melt flow rate for the ethylene-vinyl ester polymer is measured at 190° C. with a 2.16 kg melt indexer weight, in accordance with ASTM D 1238. When the melt flow rate is too high, the ethylene-vinyl ester polymer may have a melt viscosity that is too low, and does not have sufficient melt strength for 3D printing. When the melt flow rate is too low, the ethylene-vinyl ester polymer may be difficult to process as an additive-manufacture feedstock because the required piston pressure can become too high to push the highly viscous melt through the printer nozzle.

The ethylene-vinyl ester polymer (e.g., in neat form) may have an elastic modulus of from about 10 MPa to about 1500 MPa, e.g., from about 20 MPa to about 500 MPa, or from about 40 MPa to about 200 MPa, measured according to ASTM D 638.

The ethylene-vinyl ester polymer (e.g., in neat form) may have a melt viscosity of from about 100 Pa·s to 1000 Pa·s, measured at 190° C. and a shear rate of 1000 $s^{-1}$. The viscosity measurement can be carried out on a dynamic shear rheometer (DSR), according to ASTM D4440.

In some embodiments, the ethylene-vinyl ester polymer, in neat form, has an elastic modulus of from about 10 MPa to about 1500 MPa, measured according to ASTM D 638, and/or a melt viscosity of from about 100 Pa·s to about 1000 Pa·s, measured at a shear rate of 1000 $s^{-1}$. As discussed in the embodiments below, one or more additives can be added to the neat form of the ethylene-vinyl ester polymer to modify the physical or chemical properties (e.g., to balance elastic modulus vs. melt viscosity for desired piston effect), forming compounded ethylene-vinyl ester polymers.

When in the extruded article form, the ethylene-vinyl ester polymer in the additive-manufacture feedstock has a hardness of at least about 60 Shore A, at least about 70 Shore A, or at least about 80 Shore A, for a minimum processability threshold of 3D printing. A filament made by an EVA copolymer typically has a hardness considered as flexible filament; and when increasing vinyl acetate in the EVA copolymer, the hardness decreases (the filament become more flexible). When the hardness is lower than the threshold value, the filaments or pellets can become too flexible to be fed through the printer nozzle. Typically, the ethylene-vinyl ester polymer in the additive-manufacture feedstock has a hardness of at least 80 shore A, at least about 85 Shore A, at least about 90 Shore A, or at least about 93 shore A. To further increase hardness of the ethylene-vinyl ester polymer, one or more additives as described herein can be blended in the additive-manufacture feedstock.

The ethylene-vinyl ester polymer may have a peak melting point of at least about 75° C., for instance, at least about 80° C., at least about 85° C., at least about 90° C., at least about 95° C., or at least about 100° C., as measured by differential scanning calorimetry (DSC), according to ASTM D 3418-12. Typically, the ethylene-vinyl ester polymer has a peak melting point of in the range of from about 50° C. to about 130° C., from about 70° C. to about 130° C., from about 75° C. to about 110° C., or from about 85° C. to about 110° C. Within this range, the extruded articles (e.g., filaments) can be melted with a low power consumption and are easy to extrude. In addition, the extruded articles (e.g., filaments) can be rapidly solidified and have good slip properties.

In some embodiments, the ethylene-vinyl ester polymer is an ethylene-vinyl acetate polymer having one or more features/properties as follows:
i) a melt flow rate of from about 0.1 g/10 min to about 20 g/10 min (or from about 2 g/10 min to about 6 g/10 min), measured according to ASTM D 1238 (190° C./2.16 kg),
ii) a Shore A hardness of at least 80 (or at least 90, or at least 93),
iii) a linear backbone configuration (i.e., prepared by a tubular-reactor polymerization),
iv) a vinyl acetate content of from about 5.5 wt % to about 20 wt % (or from about 8.0 wt % to about 19 wt %), relative to 100 wt % of the ethylene-vinyl acetate copolymer, and/or
v) a melting point of at least 80° C. (or at least 85° C., or at least 100° C.), measured by DSC according to ASTM D 3418-12.

In some embodiments, the ethylene-vinyl ester polymer is an ethylene-vinyl acetate copolymer having two or more of the above i)-v) features/properties, three or more of the above i)-v) features, four or more of the above i)-v) features/properties, or all the above i)-v) features/properties.

In one embodiment, the ethylene-vinyl ester polymer is an ethylene-vinyl acetate copolymer having a melt flow rate of from about 0.1 g/10 min to about 20 g/10 min (or from about 2 g/10 min to about 6 g/10 min), and exhibits a Shore A hardness of at least 80 (or at least 90, or at least 93).

In one embodiment, the ethylene-vinyl ester polymer is an ethylene-vinyl acetate polymer prepared by a tubular-reactor polymerization (that has a linear backbone configuration), exhibiting a Shore A hardness of at least 80 (or at least 90, or at least 93).

In one embodiment, the ethylene-vinyl ester polymer is an ethylene-vinyl acetate polymer prepared by a tubular-reactor polymerization (that has a linear backbone configuration), having a vinyl acetate content of from about 5.5 wt % to about 20 wt % (or from about 8.0 wt % to about 19 wt %), and a Shore A hardness of at least 80 (or at least 90, or at least 93).

In one embodiment, the ethylene-vinyl ester polymer is an ethylene-vinyl acetate polymer prepared by a tubular-reactor polymerization (that has a linear backbone configuration), having a vinyl acetate content of from about 5.5 wt % to about 20 wt % (or from about 8.0 wt % to about 19 wt %), and a melt flow rate of from about 0.1 g/10 min to about 20 g/10 min (or from about 2 g/10 min to about 6 g/10 min).

The additive-manufacture feedstock can comprise the ethylene-vinyl ester polymer in an amount of from about 40 wt % to about 100 wt % (i.e., essentially a neat form of ethylene-vinyl ester polymer), relative to 100 wt % of the additive-manufacture feedstock. For instance, the ethylene-vinyl ester polymer may be present in the additive-manufacture feedstock in an amount of at least about 51 wt %, at least about 60 wt %, at least about 70 wt %, at least about 75 wt %, at least about 80 wt %, at least about 85 wt %, at least about 90 wt %, or at least about 95 wt %, relative to 100 wt % of the additive-manufacture feedstock.

The additive-manufacture feedstock may further comprise one or more additives that can be blended or compounded with the ethylene-vinyl ester polymer and count for the remainder weight percentage in the additive-manufacture feedstock.

In some embodiments, the additive-manufacture feedstock comprises at least about 51 wt % of the ethylene-vinyl ester polymer, and no more than about 49 wt % of the additive, relative to 100% of the additive manufacture feedstock.

Suitable additives include but not limited to a sliding agent; an inorganic filler or a reinforcement; an antioxidant (e.g., a hindered phenol antioxidant, sulfur-containing compound-based antioxidant, or phosphorus-containing organic compound-based antioxidants; a pigment (or a dye); an adhesion-promoting agent; a biocide (e.g., an antibacterial, fungicide, or mildewcide); a whitening agent; a nucleating agent (or an auxiliary agent that promotes crystallization); an anti-static agent; an anti-blocking agent; a processing aid; a flame-retardant (e.g., a brominated compound, phosphate, or red phosphorus); a plasticizer (e.g., phthalates and phosphate); a heat stabilizer (e.g., a phenol heat stabilizer or acrylate heat stabilizer); a UV absorber (e.g., a benzotriazole-based UV absorber, benzophenone-based UV absorber, or salicylate-based UV absorber); a light stabilizer (e.g., an organic nickel-based light stabilizer or hindered amine-based light stabilizer); a polyethylene (e.g., LLDPE, HDPE, or PE wax); a polypropylene; an elastomer; a thermoplastic polyurethane; a sizing agent or compatibilizer; a rubber; a thermoplastic hydrocarbon resin; and combinations thereof.

A sliding agent can be incorporated into the ethylene-vinyl ester polymer to improve elongation, toughness, and printability, through techniques known in the art. Suitable sliding agents include but are not limited to mineral oils; glycerol esters such as glycerol monostearate or glycerin monostearate glycerol; polyethers such as polypropylene glycol or polyethylene glycol; fluoropolymers; silanes; fatty acid amides such as oleoamides or eurucamide; and mixtures thereof. The amount of the sliding agent present in the additive-manufacture feedstock can range from about 0.05 to 3 wt %, from about 0.1 to 3 wt %, or from about 0.5 to 1 wt %, relative to 100 wt % of the additive-manufacture feedstock.

Suitable inorganic fillers include, but are not limited to, fibers (such as natural fibers, carbon fibers, glass fibers, metal fibers, ceramic fibers, organic fibers, or a combination thereof); talc; marble dust; cement dust; rice husks (e.g., including silica ash by burning rice husks); clay; carbon black; feldspar; silica or glass, fumed silica, silicate, calcium silicate, silicic acid powder, glass microspheres, or mica; metal, metal oxide, or metal salt particles and nanoparticles (such as magnesium oxide, antimony oxide, zinc oxide, barium sulfate, wollastonite, alumina, aluminum silicate, titanium oxide, or calcium carbonate); a polyhedral oligomeric silsesquioxane; and combinations thereof.

Suitable thermoplastic hydrocarbon resins include those amorphous thermoplastic polymers produced by polymerization of unsaturated hydrocarbons, typically having a low molecular weight ranging from about 400 to 5000 g/mol. Exemplary thermoplastic hydrocarbon resins are C5 aliphatic, C9 aromatic, and DCPD cycloaliphatic resins. Aliphatic hydrocarbon resins (C5 Resins) are made from C5 piperylene and its derivatives, such as cis/trans 1,3-pentadienes, 2-methyl-2-butene, cyclopentene, cyclopentadiene, and dicyclopentadiene. Aromatic hydrocarbon resins (C9 Resins) are made from C9 aromatic hydrocarbons such as indene, methyindenes, dicyclopentadiene, styrene, alpha-methylstyrene and various vinyl toluenes. These resins are sometimes hydrogenated to reduce discoloration and to improve their heat and UV stability. Thermoplastic hydrocarbon resins can also be used to increase the tack properties of the additive-manufacture feedstock.

Suitable sizing agents include those compatible with the ethylene-vinyl ester polymer. The sizing agents can be used in the additive-manufacture feedstock in various ways. For instance, the sizing agent can be chemically bonded to or coated on the inorganic fillers described above. Alternatively, the sizing agent can also be blended with the ethylene-vinyl ester polymer, functioning as a compatibilizer.

Suitable sizing agents can comprise an acid-modified propylene polymer, the polymer of acid-modified propylene polymer being a homopolypropylene or a copolymer of propylene with another α-olefin. Homopolymers of propylene exist in both amorphous and crystalline form (the latter sometimes called isotactic or stereoregular polypropylene). Either of these homopolymers of propylene can be modified for use in this invention. Likewise, propylene can be copolymerized with ethylene and/or another α-olefin to yield amorphous or crystalline copolymers. Typical copolymers in addition to that prepared with ethylene are those prepared with butene-1 and the terpolymer prepared from propylene, ethylene and a diene such as dicyclopentadiene. The acid modification can be effected with an ethylenically substituted polycarboxylic acid or an anhydride, amide, or lower alkyl ester thereof, which has its ethylenic unsaturation on a C atom in a position alpha to at least one carboxyl group or potential carboxyl group. Examples include unsaturated dicarboxylic acids such as maleic acid, itaconic acid, citraconic acid, fumaric acid, mesaconic acid, maleamic acid; anhydrides of such acids such as maleic anhydride, itaconic anhydride, citraconic anhydride, fumaric anhydride, mesaconic anhydride; amides of such acids, such as maleimide, maleamide; monoalkyl or dialkyl esters of such acids wherein the alkyl moiety has 1 to 18 carbon atoms (e.g., methyl, ethyl, propyl, butyl, etc.), such as monoalkyl or dialkyl citraconate, monoalkyl or dialkyl maleate, monoalkyl or dialkyl itaconate, monoalkyl or dialkyl fumarate, and the like. A typical sizing agent is maleic anhydride modified (or maleated) polypropylene.

The sizing agents can also include a siloxane, a silane, or a combination thereof. Examples include aminopropyltrimethoxysilane (APTES), trichlorovinylsilane (TCVS), (3-Glycidyloxypropyl)trimethoxysilane (GPTMS), (3-Mercaptopropyl)trimethoxysilane (MPTMS), and vinyltrimethoxysilane (VTMS), and polyalkylsiloxanes, such as polydimethylsiloxane.

Suitable compatibilizers include a compatibilizing ethylene copolymer; a compatibilizer comprising an epoxy resin; a compatibilizer comprising a styrene-based polymer; a compatibilizer comprising an epoxy resin and a styrene-based polymer; polycarbonate polyols; polybutadiene polyols; polysiloxane polyols; and combinations thereof.

Suitable compatibilizing ethylene copolymers are those having the formula E-X, E-Y, or E-X-Y, wherein E is ethylene, X is an α, β-ethylenically unsaturated monomer derived from an alkylacrylate, alkylmethacrylate, alkyl vinyl ether, carbon monoxide, sulfur dioxide, or mixtures thereof (wherein each alkyl group independently contains 1-8 carbon atoms), and Y is an α, β-ethylenically unsaturated monomer containing a reactive group that can form a covalent bond with the ethylene-vinyl acetate polymer components. In one embodiment, X is methyl acrylate, ethyl acrylate, ethyl methylacrylate, or butyl acrylate. In one embodiment, Y is glycidyl methacrylate, glycidyl ethylacrylate, or glycidyl butylacrylate. An exemplary compatibilizer is ethylene-methyl acrylate-glycidyl methacrylate (E-MA-GMA) terpolymer (e.g., LOTADER® AX8900).

Suitable compatibilizers can include multifunctional epoxy resins available commercially in a wide range of epoxy content, molecular weight, softening point and compositions, such as bisphenol A epoxy resin, bisphenol F epoxy resin, aliphatic epoxy resin, and phenol novolac epoxy resin. Typically used epoxy resins are aliphatic epoxy resins that easily exhibit adhesion to the thermoplastic matrix polymers. Suitable aliphatic epoxy resins include the diglycidyl ether compounds such as ethylene glycol diglycidyl ether and polyglycol ethylene glycol diglycidyl ether, propylene glycol diglycidyl ether and polypropylene glycol diglycidyl ether, 1,4-butanediol diglycidyl ether, neopentyl glycol diglycidyl ether, polytetramethylene glycol diglycidyl ether, polyalkylene glycol diglycidyl ether, etc.; and the polyglycidyl ether compounds such as glycerin polyglycidyl ether, diglycerin polyglycidyl ether, polyglycerol polyglycidyl ether, sorbitol polyglycidyl ether, arabinitol polyglycidyl ether, trimethylolpropane polyglycidyl ether, trimethylolpropane glycidyl ether, neopentyl alcohol polyglycidyl ether, aliphatic polyol polyglycidyl ether, etc.

Suitable compatibilizers can also include styrene-based polymers, including but not limited to, homopolymers of styrene, α-methylstyrene, and p-methylstyrene; a high-impact polystyrene modified with a rubber-like polymer such as styrene-butadiene copolymer rubbers, ethylene-propylene copolymer rubbers; ethylene-propylene-diene terpolymer rubbers; a styrene-maleic anhydride copolymer; a styrene-acrylonitrile copolymer; a styrene-acrylonitrile-butadiene terpolymer; a styrene-methylmethacrylate copolymer; and the like. These styrene-based polymers can be hydrogenated or non-hydrogenated. An exemplary compatibilizer is styrene acrylonitrile (SA)-epoxy (e.g., JONCRYL® ADR-4300) and styrene-butadiene copolymer rubber (e.g., S6H). These styrene-based polymers such as the styrene-butadiene copolymer rubber and other styrene-based block copolymer (either hydrogenated or non-hydrogenated styrene rubber) can also be used to increase the hardness of the ethylene-vinyl ester polymer.

Suitable compatibilizers comprising an epoxy resin and a styrene-based polymer can be prepared by blending epoxy resins with a styrene-based polymer, as described herein.

Suitable polycarbonate polyols include, but are not limited to, polycarbonate polyols such as polycarbonate diol (e.g., poly(propylene carbonate (PPC)-diol) or polycarbonate triol; polycaprolactone polyol; alkoxylated polyol; and mixtures thereof. The polyol can be a diol, triol, tetrol, or any other polyol or combinations thereof. An exemplary compatibilizer is poly(propylene carbonate (PPC)-diol.

Suitable polybutadiene polyols include, but are not limited to, those hydroxyl-functionalized polybutadienes with an average hydroxyl functionality ranging from about 2 to about 3.

Suitable polysiloxane polyols include, but are not limited to, those polymers having a polysiloxane backbone with terminal or pendant hydroxyl groups, for instance, the polybutadiene polyols described in U.S. Pat. No. 5,916,992, which is incorporated herein by reference in its entirety.

Additive-Manufacture Feedstock Comprising EVA and HDPE

Another embodiment of the present invention relates to an additive-manufacture feedstock, comprising an ethylene-vinyl ester polymer, the ethylene-vinyl ester polymer having:

a melt flow rate of from 0.1 to 150 g/10 min (190° C./2.16 kg), measured according to ASTM D 1238, and a vinyl ester content of from 1.0 to 30 wt %, relative to 100 wt % of the ethylene-vinyl ester polymer, and a high density polyethylene, wherein the ethylene-vinyl ester polymer hays a melt flow rate of from 0.1 to 150 g/10 min (190° C./2.16 kg), measured according to ASTM D 1238, has a density of from 0.950 to 0.960 g/cm$^3$ measured according to ASTM D 792, exhibits a Shore A hardness of at least 60, has weight average molecular weight varying 50,000 to 500,000, and has a polydispersity of 2 to 60.

The MFR of the HDPE can be from 0.1 to 10 g/10 min (190° C./2.16 kg), more preferably from 0.1 to 5 g/10 min (190° C./2.16 kg), such as 2 g/10 min (190° C./2.16 kg).

The density of the HDPE can be from 0.950 to 0.955 g/cm3, measured according to ASTM D 792, such as 0.952 g/cm$^3$.

The weight average molecular weight of the HDPE can be from 100,000 to 200,000 g/mol.

The carbon content of the ethylene-vinyl ester polymer and/or the HDPE may be from a fossil source or from a green source (i.e., bio-based source). The term "bio-based" as used herein refers to a material that has a fraction of its carbon content sourced from biological materials or agricultural resources, rather than from fossil carbon resources. The EVA can be present in an amount of from 50 wt % to 99 wt %, and the HDPE can be present in an amount of from 1 to 50 wt %. Preferably, the minimum amount of EVA can be from 55 wt %, 60 wt %, 65 wt %, 70 wt %, 75 wt %, 80 wt %, 85 wt %, or 90 wt %. Preferably, the maximum amount of EVA can be 45 wt %, 40 wt %, 35 wt %, 30 wt %, 25 wt %, 20 wt %, 15 wt %, or 10 wt %.

In this embodiment, a total amount of bio-based carbon, in the overall composition, coming from each of the EVA and the HDPE, or coming from both, can be at least 75 wt % of all carbon in the composition, at least 80 wt %, or at least 85 wt %.

Additive-Manufacture Feedstock and its Preparation

The additive-manufacture feedstock described herein to be supplied for 3D printing can be in various forms or shapes, such as filaments (or rods, strands, etc.), powder or pellets, or a distribution of powders or pellets (e.g., solid or liquid suspensions, such as in a slurry/paste/clay or solid mixture form).

The additive-manufacture feedstock described herein as a consumable product may be prepared as a consumable product in the form of an extruded article.

Some embodiments of the invention relate to a filament formed from the additive-manufacture feedstock described above. For instance, the additive-manufacture feedstock material may be extruded in a filament having a constant diameter. In some embodiments, the diameter of the filament ranges from 1 to 5 mm. For instance, the diameter of the filament may be 1.75 mm or 2.85 mm. Filaments with other diameters can also be extruded and used. The variation from the nominal diameter may be ±0.05 mm, or ±0.03 mm.

The resulting filament of the additive-manufacture feedstock may be wound on a spool that may be connected to a 3D printer for printing. The length of the filament is unlimited and depends on the need and practicality for the supply. Typically, the filament may have a length of about 0.1 to 50000 meters.

Some embodiments of the invention relate to a distribution (e.g., suspension) of pellets (or powders), each pellet (or powder) formed from the additive-manufacture feedstock described above. For instance, the additive-manufacture feedstock material may be extruded into powders or pellets.

The distribution (e.g., suspension) of the additive-manufacture feedstock may exist as solid or liquid suspensions of powders or pellets, e.g., in a slurry/paste/clay form, or in a solid mixture form. The distribution (e.g., suspension) of pellets (or powders) can be supplied to a 3D printer for printing. The distribution (e.g., suspension) of pellets (or powders) may have a count of 5 to 60 pellets per gram of the distribution, for instance, a count of 5 to 20 pellets per gram of the distribution, or a count of 30 to 60 pellets per gram of the distribution.

When forming the extruded article, the additive-manufacture feedstock is extruded by means known in the art using an extruder or other vessel apparatus. The term "extruder" takes on its broadest meaning and, includes any machine suitable for the ethylene-vinyl ester polymer extrusion. For instance, the term includes machines that can extrude the additive-manufacture feedstock in the form of powder or pellets, rods, strands, fibers or filaments, sheets, or other desired shapes and/or profiles. Generally, an extruder operates by feeding the feedstock material through the feed throat (an opening near the rear of the barrel) which comes into contact with one or more screws. The rotating screw(s) forces the feedstock material forward into one or more heated barrels (e.g., there may be one screw per barrel). In many processes, a heating profile can be set for the barrel in which three or more independent proportional-integral-derivative controller (PID)-controlled heater zones can gradually increase the temperature of the barrel from the rear (where the plastic enters) to the front.

The vessel can be, for instance, a single-screw or a twin-screw extruder, or a batch mixer. Further descriptions about extruders and processes for extrusion can be found in U.S. Pat. Nos. 4,814,135; 4,857,600; 5,076,988; and 5,153,382; all of which are incorporated herein by reference.

When a melt extrusion is used, the temperature and conditions for extruding the additive-manufacture feedstock may be different according to the type of the ethylene-vinyl ester polymer.

Another aspect of the invention relates to a method of making an additive-manufacture feedstock. The method comprises polymerizing an ethylene comonomer and one or more vinyl ester comonomers to form an ethylene-vinyl ester polymer. The formed ethylene-vinyl ester polymer has a melt flow rate of from 0.1 to 150 g/10 min, measured according to ASTM D 1238 (190° C./2.16 kg); a vinyl ester content of from 1.0 to 30 wt %, relative to 100 wt % of the ethylene-vinyl ester polymer; and a Shore A hardness of at least 60.

In some embodiments, polymerizing to form the ethylene-vinyl ester polymer is carried out in an autoclave-reactor polymerization to promote the formation of a more long-chain branched architecture.

In some embodiments, polymerizing to form the ethylene-vinyl ester polymer is carried out in a tubular-reactor polymerization to promote the formation of a more linear backbone configuration (as compared to a more branched or star configuration). Using a tubular-reactor polymerization is particularly useful for preparing filaments.

All above descriptions and all embodiments discussed in the above aspect relating to the additive-manufacture feedstock, including various aspects of the ethylene-vinyl ester polymer; the ethylene comonomer and vinyl ester comonomers; the additives; and the amounts used thereof; and the various features and properties of the ethylene-vinyl ester polymer are applicable to this aspect of the invention relating to a method of making an additive manufacture feedstock.

In some embodiments, the disclosure provides a method of making an extruded article for three-dimensional printing with an improved degree of c (e.g., a higher consistency to the targeted 3D model with a higher dimensional accuracy and minimized warpage). The method comprises polymerizing an ethylene comonomer and one or more vinyl ester comonomers to form an ethylene-vinyl ester polymer, wherein the formed ethylene-vinyl ester polymer has a melt flow rate of from 0.1 to 150 g/10 min, measured according to ASTM D 1238 (190° C./2.16 kg); a vinyl ester content of from 1.0 to 30 wt %, relative to 100 wt % of the ethylene-vinyl ester polymer; and a Shore A hardness of at least 60. The method further comprises heating the additive-manufacture feedstock to a molten state, and extruding the additive-manufacture feedstock to form an extruded article. The ethylene-vinyl ester polymer in the extruded article form, particularly in filament form, provides desired piston effects and exhibits an improved degree of printability (e.g., a higher consistency to the targeted 3D model with a higher dimensional accuracy and minimized warpage).

The method described herein selects the components for the additive-manufacture feedstock by balancing the vinyl ester content of the ethylene-vinyl ester polymer against the elastic modulus and melt viscosity of the ethylene-vinyl ester polymer, polymer architecture, melt flow index, hardness, and melt temperature of the ethylene-vinyl ester polymer to result in an additive-manufacture feedstock product suitable for 3D printing. The product has a hardness and toughness that can be easily fed to the 3D printer nozzle and withstand normal wear and tear of handling on a filament spool. It has successfully produced 3D printing articles that has a high consistency to the targeted 3D model with high dimensional accuracy and substantially no warpage, good layer adhesion, and satisfactory bed adhesion.

3D Printing Using the Additive-Manufacture Feedstock

Another aspect of the invention relates to a method of three-dimensional printing. The method comprises: (1) supplying the additive-manufacture feedstock as described from the above aspect of the invention to a printing apparatus and forming a hot-melt of the additive-manufacture feedstock; (2) depositing the hot-melt of the additive-manufacture feedstock from the printing apparatus on a substrate to form a first deposited printing layer; (3) repeating (1) and (2) to deposit a second printing layer on the first printing layer; and (4) optionally depositing at least one further printing layer on said second printing layer.

All above descriptions and all embodiments discussed in the above aspect relating to the additive-manufacture feedstock, including various aspects of the ethylene-vinyl ester polymer; the ethylene comonomer and vinyl ester comonomers; the additives; and the amounts used thereof; and the various features and properties of the ethylene-vinyl ester polymer, are applicable to this aspect of the invention relating to a method of three-dimensional printing.

Additionally, all above descriptions and all embodiments discussed in the above aspect relating to the method of making an additive-manufacture feedstock or the method of producing an extruded article for three-dimensional printing with an improved degree of printability are also applicable to this aspect of the invention relating to a method of three-dimensional printing.

The printing apparatus (i.e., the 3D printer) can employ various 3D printing technologies known in the art. In some embodiments, the printing apparatus employs an extrusion-based 3D printing technology. For instance, an extrusion-based 3D printer may be used to build a 3D model from a digital representation of the 3D model in a layer-by-layer manner by extruding a flowable modeling additive-manufacture feedstock.

In one embodiment, the printing apparatus employs a fused filament fabrication (FFF) (or fused deposition modelling, FDM) method. In an exemplary embodiment, a filament of the additive-manufacture feedstock is extruded through an extrusion tip carried by an extrusion head and deposited as a sequence of roads on a substrate in an x-y plane. The extruded additive-manufacture feedstock fuses to previously deposited additive-manufacture feedstock and solidifies upon decreasing temperature. The position of the extrusion head relative to the substrate is then incremented along a z-axis (perpendicular to the x-y plane), and the process is then repeated to form a 3D model resembling the digital representation. Movement of the extrusion head with respect to the substrate is performed under computer control, in accordance with build data that represents the 3D model. The build data is obtained by slicing the digital representation of the 3D model into multiple horizontally sliced layers. For each sliced layer, the host computer generates a build path for depositing roads of modeling material to form the 3D model.

In one embodiment, the printing apparatus employs a fused particle fabrication (FPF) (or fused granular fabrication, FGF) method.

In one embodiment, the printing apparatus employs a pellet extrusion method.

The additive-manufacture feedstock may be supplied to the printing apparatus in various forms or shapes, such as filaments (or rods, strands, etc.), powder or pellets, or a distribution (e.g., solid or liquid suspensions, such as in a slurry/paste/clay or solid mixture form) of powders or pellets, as discussed above.

The supplied additive-manufacture feedstock is then printed, according to the modeling based on the 3D method (e.g., FFF or FPF model), by first forming a hot-melt of the additive-manufacture feedstock (at a temperature above the melting point and/or softening point of one or more components of the additive-manufacture feedstock), and then depositing the hot-melt of the additive-manufacture feedstock from the printing apparatus on a substrate to form a first deposited printing layer. The hot-melt of the additive-manufacture feedstock may be formed by extruding the additive-manufacture feedstock through the printing apparatus.

The supplying and depositing steps are repeated to deposit a second printing layer and further printing layer(s) on the first printing layer, until a printed article according to the 3D model is obtained.

The deposited printing layer(s) or final printed article may be solidified by a method known in the art. For instance, the deposited printing layer or final printed article may be further treated by sintering, hydrating, coating, melting, infiltrating, freezing, crystallizing, precipitating and/or crosslinking.

EXAMPLES

The following examples are for illustrative purposes only and are not intended to limit, in any way, the scope of the present invention.

Example 1—Additive-Manufacture Feedstock Containing EVA Copolymer

Exemplary additive-manufacture feedstock used in the examples are ethylene-vinyl acetate copolymers with five different grades by varying the vinyl acetate contents, melt flow rates, hardness, and polymerization process. EVA 1 was prepared using an autoclave polymerization process in an autoclave reactor, contains about 28% vinyl acetate content (high VA), and has a melt flow rate of about 6 g/10 min (190° C./2.16 kg), measured with a ASTM-D1238 standard. EVA 2 was prepared using an autoclave polymerization process in an autoclave reactor, contains about 28% vinyl acetate content (high VA), and has a melt flow rate of about 25 g/10 min (190° C./2.16 kg), measured with a ASTM-D1238 standard. EVA 3 was prepared using an autoclave polymerization process in an autoclave reactor, contains about 19% vinyl acetate content (medium VA), and has a melt flow rate of about 2.5 g/10 min (190° C./2.16 kg), measured with a ASTM-D1238 standard. EVA 4 was prepared using a tubular polymerization process in a tubular reactor, contains about 19% vinyl acetate content (medium VA), and has a melt flow rate of about 2 g/10 min (190° C./2.16 kg), measured with a ASTM-D1238 standard. EVA 5 was prepared using a tubular polymerization process in a tubular reactor, contains about 8% vinyl acetate content (low VA), and has a melt flow rate of about 2 g/10 min (190° C./2.16 kg), measured with a ASTM-D1238 standard.

The EVA copolymers described above were either from fossil carbon sources or from bio-based carbon sources (green). All five EVA copolymers were mostly in a neat form, containing possibly only a small amount of a primary antioxidant (e.g., about 100 to 450 ppm).

Tests of filament production and 3D printing by Fused Filament Fabrication (FFF) technology with produced filaments were conducted with these EVA copolymer samples, according to the experimental conditions below, and the results are summarized in FIG. 1 and FIG. 2.

Filament Production Tests:

The EVA copolymer samples were extruded at a temperature within the range of 90-130° C., depending on the individual EVA copolymer sample, through a single screw extruder to form a filament having a constant diameter of 1.75 mm (±0.05). The filament obtained was wound on a spool that may be connected to the 3D printer. The results of filament production tests are summarized in FIG. 1.

As shown in FIG. 1, filaments were successfully produced with EVA 1, EVA3, EVA 4, and EVA 5 copolymer samples, with the filaments having a constant diameter of 1.75 mm. The diameter variation of the resulting filaments was very low (i.e., maximum deviation of 2% from 1.75 mm, 1.71 to 1.78 mm).

EVA 2 copolymer sample did not successfully pass the filament production test: EVA 2 copolymer caused an issue when the sample was pulled through the filament production system, possibly because EVA 2 copolymer presented too much tackiness.

FFF 3D Printing Tests:

Each of the filaments successfully prepared from the above filament production test (EVA 1, EVA 3, EVA 4, and EVA 5 samples) was then loaded to a Fused Filament Fabrication based desktop 3D printer AE3D Plus 3D (AE3D, Valinhos, Brazil), and printed with the following print parameters:
Nozzle diameter—0.4 mm
Printing temperature—230° C.
Bed temperature—room temperature
Thickness of layer—0.2 mm
Print speed—10 mm/s A polyolefin-based adhesive was applied to the printer bed to promote the EVA adhesion on the glass printer bed.

Figure 2:
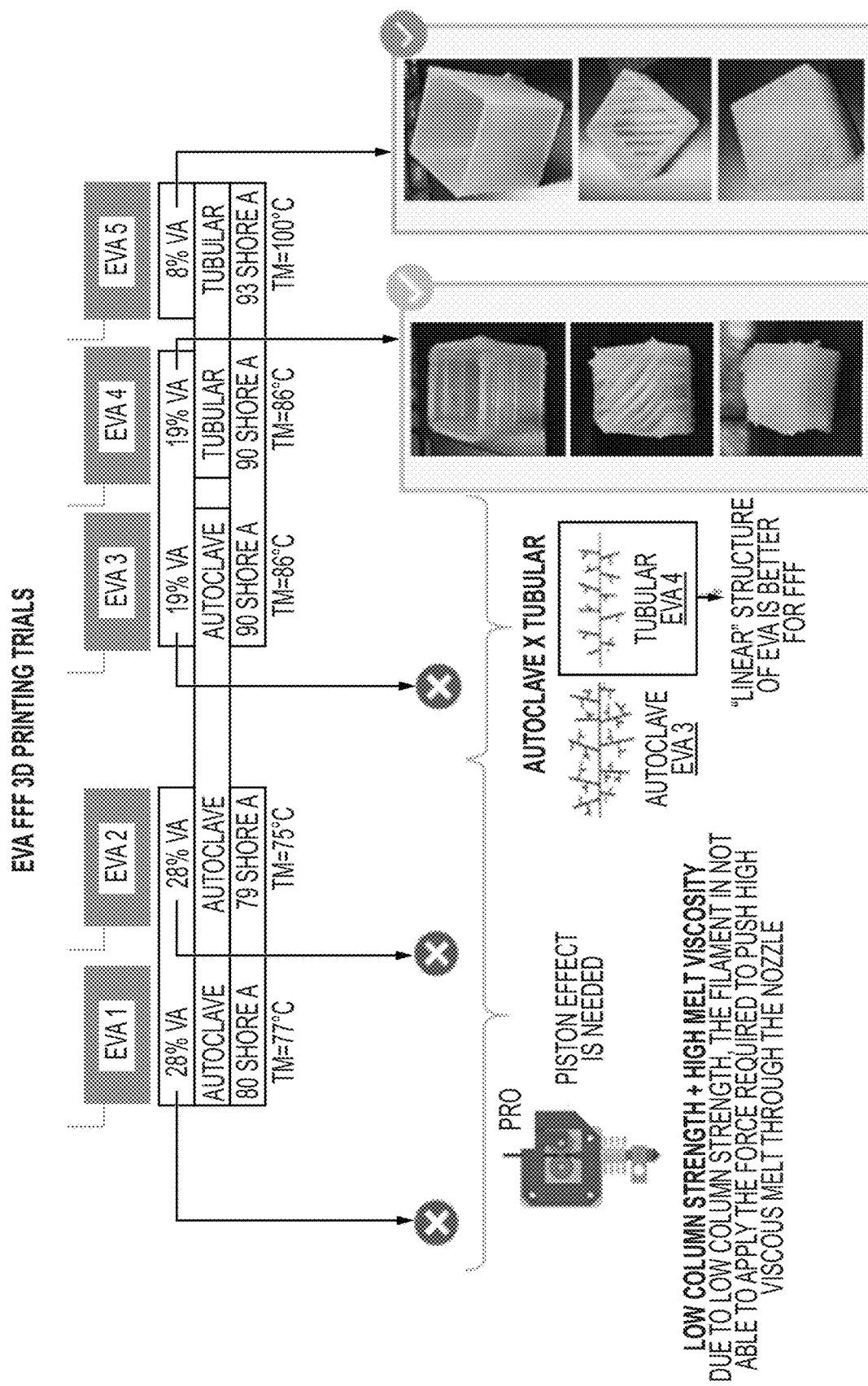
FIG. 2 shows the exemplary additive-manufacture feedstock used in Example 1, illustrating five different ethylene-vinyl acetate (EVA) copolymer samples, EVA 1, EVA 2, EVA 3, EVA 4, and EVA 5, and their respective vinyl acetate content, polymerization technology, Shore A hardness, and melting temperature (Tm).

The results of FFF 3D printing tests are summarized in FIG. 1 and FIG. 2.

Figure 14:
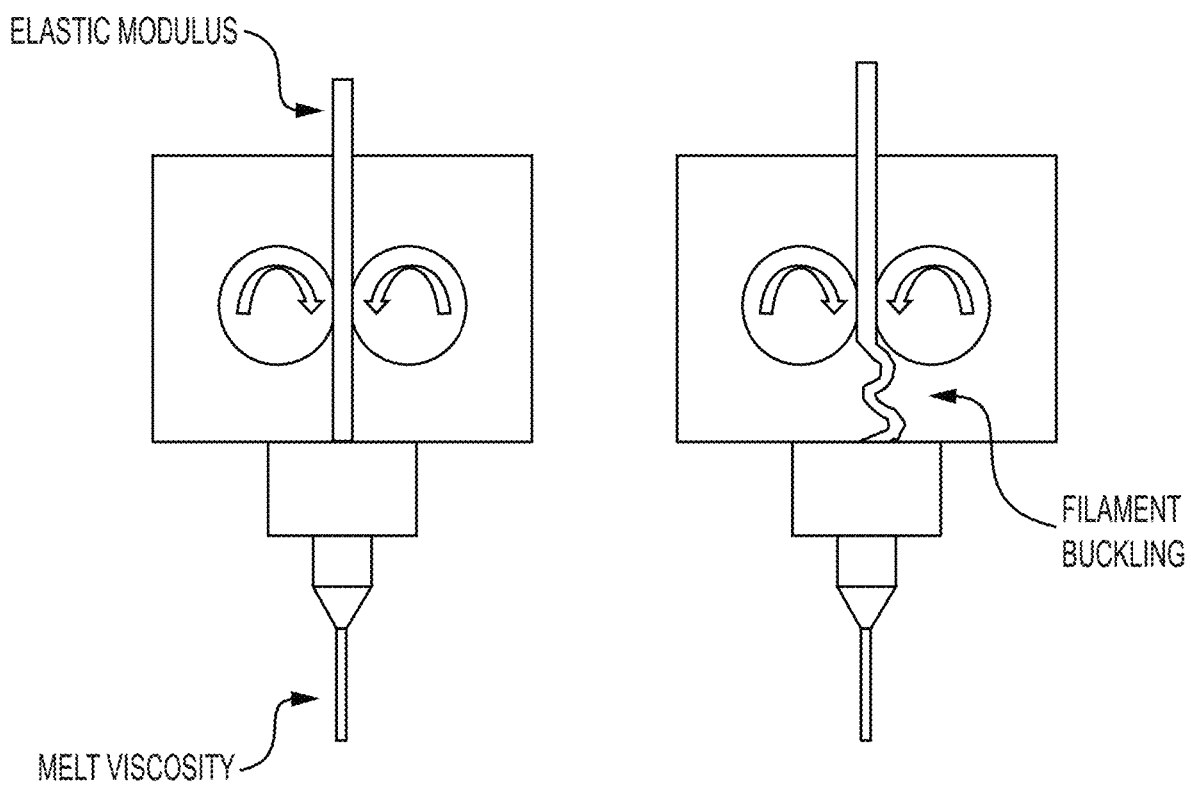
FIG. 14 depicts two 3D printer nozzles showing filament being pushed by a pinch-roller feed mechanism into a melting reservoir.

Without being bound by theory, the filament acts as both feedstock and a piston that drives the extrusion of feedstock. As shown in FIG. 14, the necessary pressure for fiber extrusion is applied by the solid portion of the filament, which acts as a piston as it is pushed by a pinch-roller feed mechanism into a melting reservoir, placed on the upper part of the 3D printer nozzle.

The filament's elastic modulus determines its load carrying ability (driving force) and its melt viscosity determines the resistance to extrusion (or extrusion pressure). When the filament presents low column strength and high melt viscosity, the filament can buckle, as the filament is not able to apply sufficient pressure required to push the high viscous melt through the printer nozzle.

A filament will buckle if the pressure applied exceeds that of the material's critical buckling stress. This can be determined by the ratio of the elastic modulus to the apparent viscosity. It is known that critical buckling stress of a column $\sigma_{crit}$ can be determined by the following equation: $\sigma_{crit} = \pi^2 E/4(L/R)^2$, where E is the compressive stiffness of filament, and L/R is the slenderness ratio for a column. See Venkataraman et al., "Feedstock material property—process relationships in fused deposition of ceramics (FDC)," *Rapid Prototyping Journal* 6(4): 244-253 (2000), which is incorporated herein by reference in its entirety. The filaments do not buckle during the extrusion when an elastic modulus to apparent viscosity ratio ($E/\eta_\alpha$) (measured using a capillary rheometer) is greater than a critical a critical buckling stress.

The filament produced from EVA 1 sample did not successfully pass the FFF 3D printing test and had an issue during the initial printing phase. This is perhaps because the resulting filament was too soft, and the needed piston effect of the solid portion of the filament pushing the melted portion through the 3D printer nozzle was not reached. Due to low column strength, the filament may not have been able to apply sufficient pressure required to push the highly viscous melt through the nozzle.

The filament produced from EVA 3 sample successfully started the initial printing and deposited a first layer of the polymer, but caused an issue during the deposition of subsequent layers. This too may be explained by the buckling issue and insufficient piston effect provide by the filament. As shown in FIG. 1, compared to the filament produced from EVA 1 sample having a high amount of VA content and a Shore A hardness of 80, the filament produced from EVA 3 sample was harder, having a medium amount of VA content (19 wt %) and a Shore A hardness of 90. The filament produced from EVA 3 sample provided a better printing result than the filament produced from EVA 1 sample, but the printing tests from both filaments were not satisfactory.

FFF 3D printing tests were successfully carried out with the filaments prepared from EVA 4 and EVA 5 copolymer samples. The polymer samples for both filaments were polymerized in a tubular reactor, which could have produced a polymer with more linear backbone architecture.

A polymer feedstock having a linear backbone configuration may have contributed to the successful FFF 3D printing. As shown in FIGS. 1 and 2, comparing the filament produced from EVA 4 sample against the filament produced from EVA 3 sample: both contained a same amount of VA content (19 wt %), a similar MFR (2 g/10 min for EVA 4 vs. 2.5 g/10 min for EVA 3), and a same hardness (90 shore A). A main difference between these two filaments is that EVA 3 sample was polymerized in an autoclave reactor, which could have produced a polymer with long-chain branched architecture, whereas EVA 4 sample was polymerized in a tubular reactor, which could have produced a polymer with more linear backbone architecture.

Among the four filaments produced, the filament produced from EVA 5 copolymer sample presented the best 3D printing results. As shown in FIG. 2, both filaments produced from EVA 4 and EVA 5 samples were able to print various 3D articles with various shapes having various geometric complexity (each based on the same targeted 3D model). The filament produced from EVA 5 sample provided a higher consistency to the targeted 3D model with a higher dimensional accuracy and minimized warpage, whereas the filament produced from EVA 4 sample provided less consistency to the targeted 3D model even when using a very low printing speed (10 mm/s). This was shown, in particular, when printing objects having a highly complex geometry, in which EVA 5 sample demonstrated a high degree of printability using the inventive additive-manufacture feedstock for 3D printing of a complex part.

EVA 5 sample has the lowest VA content (8 wt %), and thus was less amorphous in comparison with other EVA copolymer samples tested. Surprisingly, however, even though EVA 5 was less amorphous than other EVA copolymer samples, 8% of VA content appeared to have provided enough crystalline reduction to provide 3D printed article with higher consistency to the targeted 3D model and substantially no warpage, good layer adhesion, and satisfactory bed adhesion. In addition, the benefits that a higher VA content may bring to an EVA polymer feedstock for a successful FFF 3D printing process may be provided by carefully selecting the polymer composition for the feedstock that can provide the desirable piston effect (elastic modulus vs. melt viscosity) and desirable polymer architecture.

FFF 3D Printing Benchy Box Tests

The benchy box test is a Braskem internal standard to compare materials performance on Fused Filament Fabrication (FFF) technology. This test consists on printing a box that showcases a number of geometries that can be difficult to print (i.e.—posts that are close together, bridges, squares, and letters). The samples are printed at the center of 3D printer's bed using the predefined slicing parameters to maintain consistency between various materials. The printed sample is graded based on criteria specified that follows.

Figure 3:
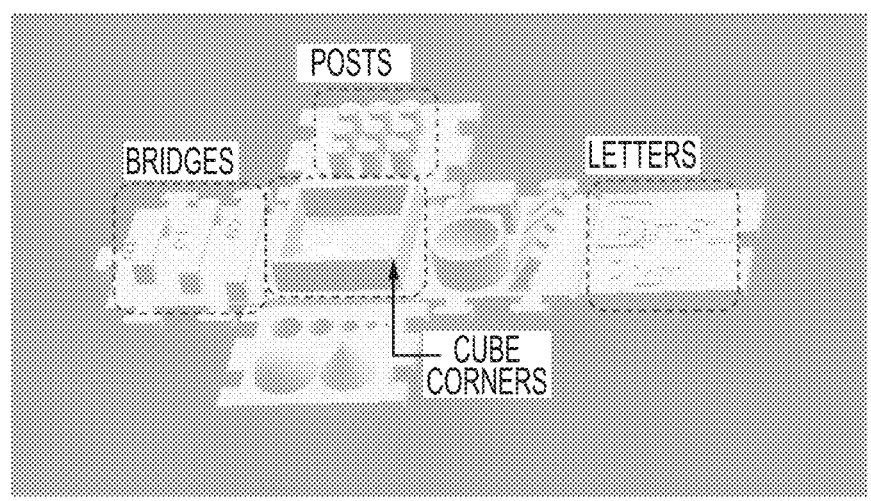
FIG. 3 shows a benchy box test and properties considered for rating EVA 3D printing compositions of the present invention.
Figure 4:
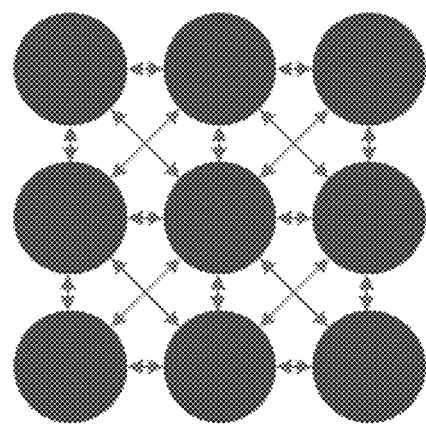
FIG. 4 shows details for measuring stringing between posts of a benchy box.
Figure 4:

For the samples analyzed, the main properties rated were the ability to print bridges with no stringing underneath them, stringing between close posts and resolution by cube corners and letters accuracy. The general shape of a benchy box, with the main properties defined, can be seen in FIG. 3, and FIG. 4 shows details as to how to measure stringing between posts of the benchy box. Maximum printing speed is also an important factor to consider when ranking materials performance.

Three EVA compositions according to the present invention, were used to make three benchy boxes. The three samples are:
1) SAMPLE 1: Neat tubular grade EVA with 19% VA
2) SAMPLE 2: Neat tubular grade EVA with 8% VA
3) SAMPLE 3: Blend of Tubular grade EVA with 19% VA+HDPE, at a 80:20 wt % mixture of EVA:HDPE Table 1 shows the parameters used in analyzing benchy boxes made with Samples 1, 2, and 3, along with the weighting score.

TABLE 1

| | Description | Values | Weighting |
|---|---|---|---|
| Printing Speed | Maximum Printing Speed Tested | 10 mm/s-50<br>20 mm/s-100 | 0.3 |
| Resolution 1 | Cube Corners accuracy | Fully Accurate-100<br>Not Fully Accurate (NFA)-70<br>NFA + Blobs-50<br>Didn't print-1 | 0.2 |
| Resolution 2 | Written Letters accuracy | Fully Accurate-100<br>Not Fully Accurate (NFA)-70<br>NFA + Blobs-50<br>Didn't print-1 | 0.2 |
| Bridge Span | Longest bridge printed with no stringing | 0-0<br>10-50<br>15-70<br>20-100 | 0.15 |
| Stringing | Number of spots where stringing occurs between posts | 0-16 | 0.15 |

Figure 5:
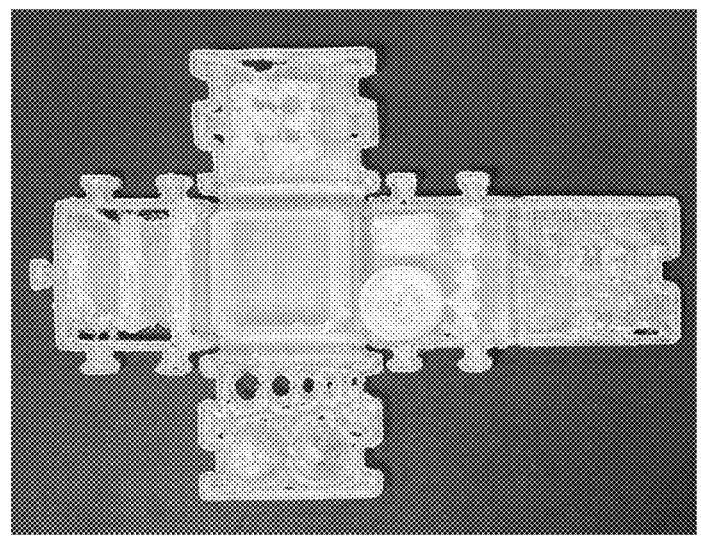
FIG. 5 shows a benchy box printed with Sample 1.

FIG. 5 shows the benchy box made with Sample 1. Table 2 shows slicing parameters for printing with Sample 1, and Table 3 shows results for the benchy box made with Sample 1.

TABLE 2

| Predefined Slicing Parameters | | |
|---|---|---|
| Nozzle Diameter: | 0.4 | mm |
| Layer Height: | 0.15 | mm |
| Wall Count: | 4 | # |
| Top/Bottom Walls | 8 | # |
| Infill | 20 | % |
| Infill Pattern | Lines | |
| Infill Line Directions | NA | ° |
| Print Speed | 20 | mm/s |
| Initial Print Speed | 20 | mm/s |
| Slower Layers | 2 | # |
| Support | off | |
| Variable Slicing Parameters | | |
| Printing temperature | 230 | ° C. |
| Bed temp Initial | 90 | ° C. |
| Bed temp | 25 | ° C. |
| Cooling Speed | 100 | % |
| Brim | 0 | mm |
| Part Location | | |
| x | 0 | mm |
| y | 4.588 | mm |
| z | 0 | mm |

TABLE 3

| | Description | Values | Weighting | SAMPLE 1 |
|---|---|---|---|---|
| Printing Speed | Maximum Printing Speed Tested | 10 mm/s-50<br>20 mm/s-100 | 0.3 | 50 |
| Resolution 1 | Cube Corners accuracy | Fully Accurate-100<br>Not Fully Accurate (NFA)-70<br>NFA + Blobs-50<br>Didn't print-1 | 0.2 | 50 |
| Resolution 2 | Written Letters accuracy | Fully Accurate-100<br>Not Fully Accurate (NFA)-70<br>NFA + Blobs-50<br>Didn't print-1 | 0.2 | 70 |
| Bridge Span | Longest bridge printed with no stringing | 0-0<br>10-50<br>15-70<br>20-100 | 0.15 | 0 |

TABLE 3-continued

| | Description | Values | Weighting | SAMPLE 1 |
|---|---|---|---|---|
| Stringing | Number of spots where stringing occurs between posts | 0-16 | 0.15 | 37.5 |
| | | | | 44.6 |

Figure 6:
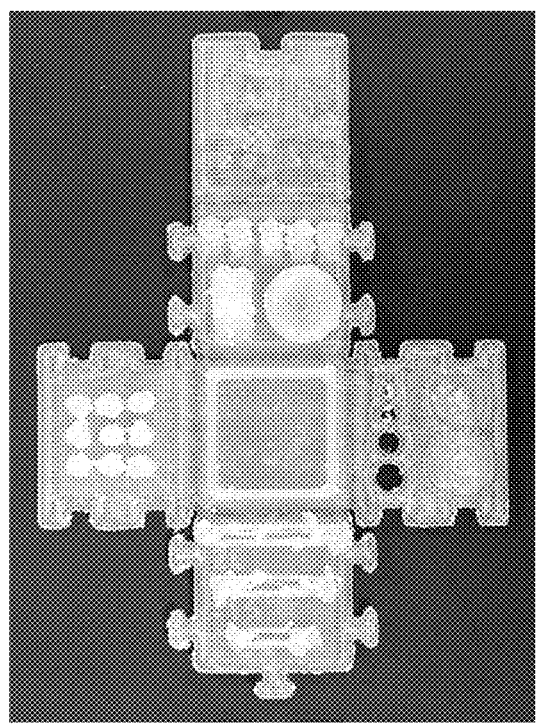
FIG. 6 shows a benchy box printed with Sample 2.

FIG. 6 shows the benchy box made with Sample 2. Table 4 shows slicing parameters for printing with Sample 2, and Table 5 shows results for the benchy box made with Sample 2.

Figure 7:
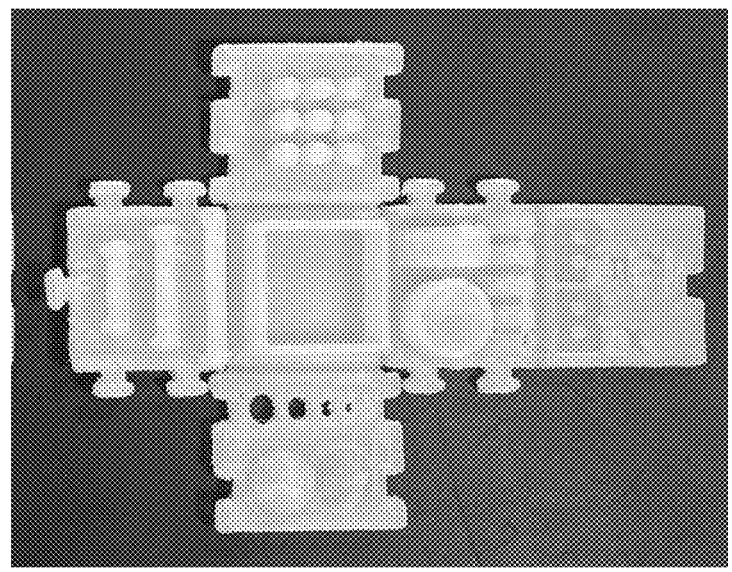
FIG. 7 shows a benchy box printed with Sample 3.

FIG. 7 shows the benchy box made with Sample 3. Table 6 shows slicing parameters for printing with Sample 3, and Table 7 shows results for the benchy box made with Sample 3.

TABLE 4

| Predefined Slicing Parameters | | |
|---|---|---|
| Nozzle Diameter: | 0.4 | mm |
| Layer Height: | 0.15 | mm |
| Wall Count: | 4 | # |
| Top/Bottom Walls | 8 | # |
| Infill | 20 | % |
| Infill Pattern | Lines | |
| Infill Line Directions | NA | ° |
| Print Speed | 20 | mm/s |
| Initial Print Speed | 20 | mm/s |
| Slower Layers | 2 | # |
| Support | off | |
| Variable Slicing Parameters | | |
| Printing temperature | 230 | ° C. |
| Bed temp Initial | 90 | ° C. |
| Bed temp | 25 | ° C. |
| Cooling Speed | 100 | % |
| Brim | 0 | mm |
| Part Location | | |
| x | 0 | mm |
| y | 4.588 | mm |
| z | 0 | mm |

TABLE 5

| | Description | Values | Weighting | SAMPLE 2 |
|---|---|---|---|---|
| Printing Speed | Maximum Printing Speed Tested | 10 mm/s-50 20 mm/s-100 | 0.3 | 100 |
| Resolution 1 | Cube Corners accuracy | Fully Accurate-100 Not Fully Accurate (NFA)-70 NFA + Blobs-50 Didn't print-1 | 0.2 | 70 |
| Resolution 2 | Written Letters accuracy | Fully Accurate-100 Not Fully Accurate (NFA)-70 NFA + Blobs-50 Didn't print-1 | 0.2 | 100 |
| Bridge Span | Longest bridge printed with no stringing | 0-0 10-50 15-70 20-100 | 0.15 | 0 |
| Stringing | Number of spots where stringing occurs between posts | 0-16 | 0.15 | 68.75 |
| | | | | 74.3 |

TABLE 6

| Predefined Slicing Parameters | | |
|---|---|---|
| Nozzle Diameter: | 0.4 | mm |
| Layer Height: | 0.15 | mm |
| Wall Count: | 4 | # |
| Top/Bottom Walls | 8 | # |
| Infill | 20 | % |
| Infill Pattern | Lines | |
| Infill Line Directions | NA | ° |
| Print Speed | 20 | mm/s |
| Initial Print Speed | 20 | mm/s |
| Slower Layers | 2 | # |
| Support | off | |
| Variable Slicing Parameters | | |
| Printing temperature | 230 | ° C. |
| Bed temp Initial | 90 | ° C. |
| Bed temp | 25 | ° C. |
| Cooling Speed | 100 | % |
| Brim | 0 | mm |
| Part Location | | |
| x | 0 | mm |
| y | 4.588 | mm |
| z | 0 | mm |

TABLE 7

| Description | | Values | Weighting | SAMPLE 3 |
|---|---|---|---|---|
| Printing Speed | Maximum Printing Speed Tested | 10 mm/s-50<br>20 mm/s-100 | 0.3 | 100 |
| Resolution 1 | Cube Corners accuracy | Fully Accurate-100<br>Not Fully Accurate (NFA)-70<br>NFA + Blobs-50<br>Didn't print-1 | 0.2 | 100 |
| Resolution 2 | Written Letters accuracy | Fully Accurate-100<br>Not Fully Accurate (NFA)-70<br>NFA + Blobs-50<br>Didn't print-1 | 0.2 | 100 |
| Bridge Span | Longest bridge printed with no stringing | 0-0<br>10-50<br>15-70<br>20-100 | 0.15 | 100 |
| Stringing | Number of spots where stringing occurs between posts | 0-16 | 0.15 | 75 |
| | | | | 96.3 |

Figure 8:
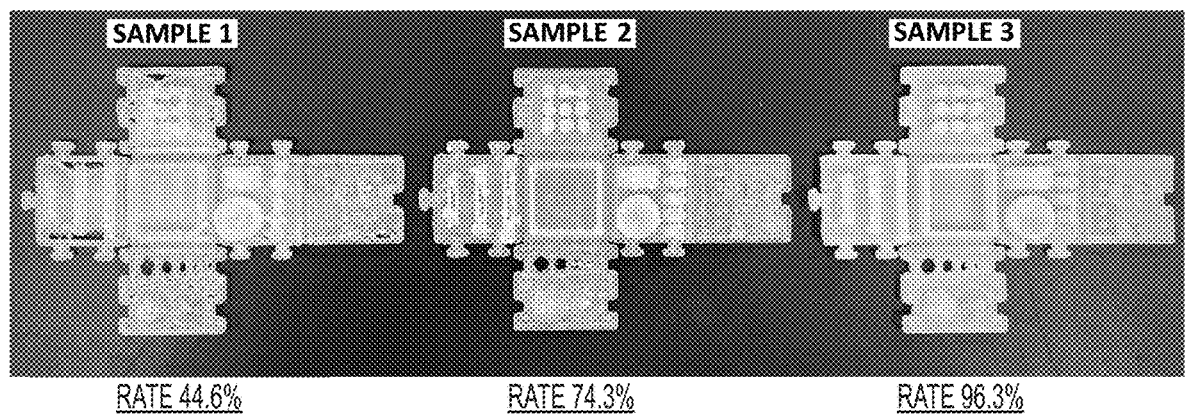
FIG. 8 shows a side-by-side comparison of benchy boxes printed with Samples 1, 2, and 3, respectively.

Samples 1 and 2 are EVA-based FFF samples that do not contain HDPE, while Sample 3 is an EVA/HDPE FFF sample. As seen in the results, it was possible to print reasonable benchy boxes with all samples tested, but the accuracy of benchy box details printed with Sample 3 was improved in comparison with the others. For instance, the cube corner accuracy slightly improves in the benchy box made with Sample 1 to the benchy box made with Sample 2, but the cube corner accuracy is greatly improved in the benchy box made with Sample 3. These results can also be seen in a side-by-side comparison of FIG. 8. In view of these results, FFF printability can be surprisingly improved by blending tubular grades EVA with HDPE. The rationale behind it is to reduce polymer melt strength by decreasing the total amount of long chain branching (LCB) on its structure. A total amount of long chain branches can be quantified by Gel Permeation Chromatography (GPC) as described herein.

GPC and Mark-Houwink Plots

A Mark-Houwink-Sakurada (MH) plot can demonstrate the reduction in LCB content that results from incorporating an increasing amount of polyethylene. Details on MH Plot construction are described in Polymer 42 (2001) 8947-8958, Journal of Applied Polymer Science 80 (2001), 2815-2822, and Polymer 50 (2009) 5390-5397, each incorporated herein by reference.

A MH plot can be split into two different regions. The first region is overlaid by the linear reference and presents no change in the slope, which herein is called a "linear region" and described by $\alpha_1$ and $k_1$ as the MH exponent and coefficient, respectively. The second region is called the "branched region" and is seen in the region where the curve deviates from the initial linear slope at higher molecular weights and is described by $\alpha_2$ and $k_2$. For a linear polyethylene in 1,2-Dicholorbenzene at 140° C., the value of $\alpha_1$ and $\alpha_2$ are equal and assumed to be 0.7000. When long chain branches are not present and the SCB is equally distributed along molecular weight, $\alpha_1$ spans the entire range of the distribution such that $\alpha_2 = \alpha_1$. However, when LCB are present, the values of $\alpha_2$ and $\alpha_1$ diverge. The presence of LCB in a chain will compact the coil in solution, increasing its density in comparison to a linear chain of same molecular weight. This density increase is seen as an intrinsic viscosity decrease. The decrease in intrinsic viscosity due LCB, present mainly in high molecular weight will give a MH plot where $\alpha_2 < \alpha_1$.

Figure 9:
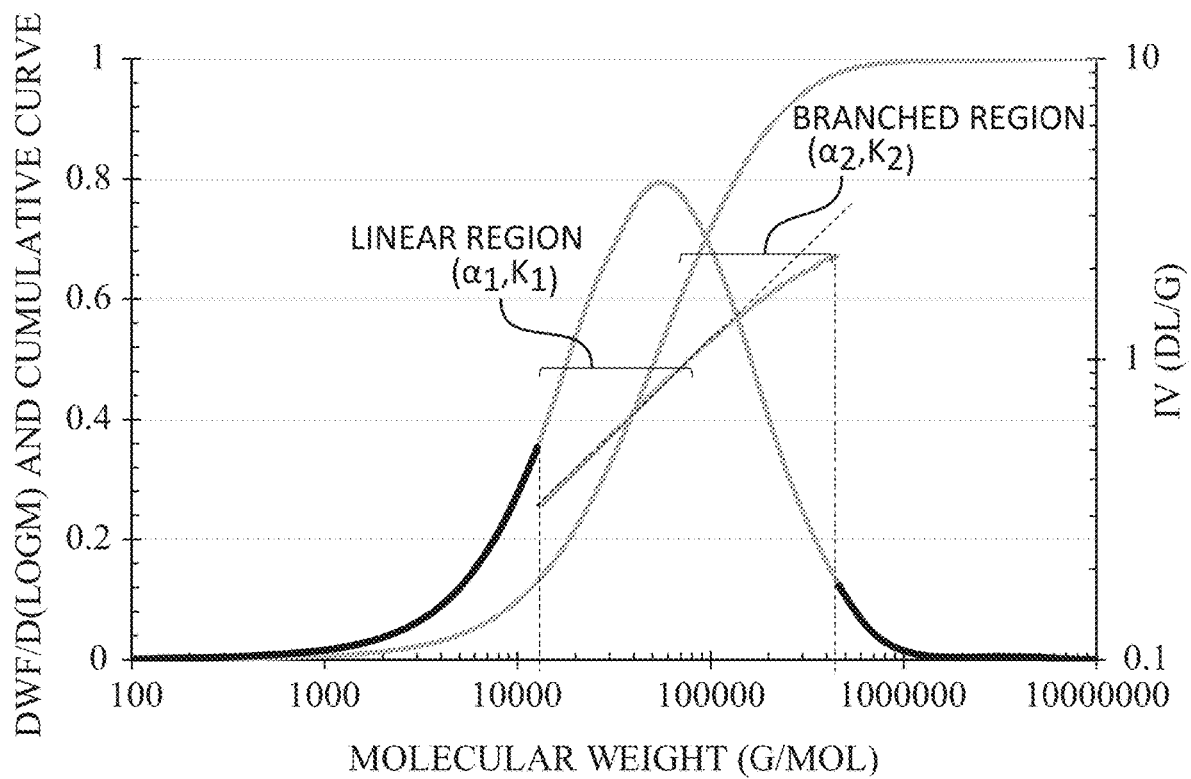
FIG. 9 shows an exemplary Mark-Houwink (MH) plot.

FIG. 9 shows an exemplary MH plot that includes the linear and branched regions. In this MH plot, the portion of the plot parallel or overlaid with the line labeled as "linear reference" is considered to be a "linear region." From the point where the curve deviates from the "linear reference" to the upper end of the curve is considered to be a "branched region" corresponding to the effects of long chain branching. The set of molecular weight range where alpha and k are calculated for both linear and branched region are defined based on several criteria as: It must comprise at least 10% and no more than 40% of the area under the dWf/d Log M curve, only regions above 15% and below 98.5% of cumulative curve must be considered in the definition of linear and branched region limits, as presented in FIG. 9, this is to effectively remove scattered points on MH plot, for which the S/N in pressure signal is too low. Linear and branched region may not overlap, $\alpha_2$ must be defined in the region of molecular weight above $10^5$ g/mol, and the r-square value of the fit in both regions ("linear region" and "branched region") must be equal or higher to 0.99. The ratio between $\alpha_2$ and $\alpha_1$ ($\alpha_2/\alpha_1$) can be used to compare the different regions on the MH plot and indicate the amount of modification present in the long chain branched regions compared with the linear. This ratio highlights the differences in LCB between the samples and compensates for any SCB contributions across the entire molecular weight range. Ratios near one indicate a decrease in the amount of LCB present. As the ratio decreases from one, the ratio indicates an increasing amount of LCB.

For Samples 1, 2, and 3, long chain branching was evaluated based on GPC analysis, for example, using a GPC instrument equipped with IR6 infrared detector and a four-capillary viscometry detector, both from Polymer Char. Analysis conditions include a flow rate of 1 mL/min, an injection volume of 200 μL, and a column temperature of 140° C. Four columns TSKgel GMH$_{HR}$-H(S) HT in series were used to fractionate the samples according to their size. Individual samples were dissolved in ODCB at 160° C. for one hour, wherein a solvent volume was added in order to achieve a solution concentration of 1 mg/mL. Data collection may be performed using, for example, Polymer Char's software to obtain data such as molecular weight (e.g. number average molecular weight (Mn) and weight average molecular weight (Mw)). The concentration measured by IR6 detector may be calculated considering that the whole area of the chromatogram was equivalent to the elution of 100% of the mass injected.

Mw is the weight average molecular weight and is calculated according to the following equation by means of universal calibration:

$$M_w = \left[ \frac{\sum (N_i M_i^2)}{\sum (N_i M_i)} \right]$$

The ratio between weight average molecular weight calculated based on universal calibration and the weight average molecular weight calculated based on conventional calibration considering $\alpha=0.7200$ and $k=0.00050600$ (MH exponent and coefficient for a linear PE) is used to estimate the contribution of branches in Mw. The ratio between these weight average molecular weights indicates a reduction on LCB and short chain branching (SCB_ as the amount of polyethylene increases in the blend.

Figure 10:
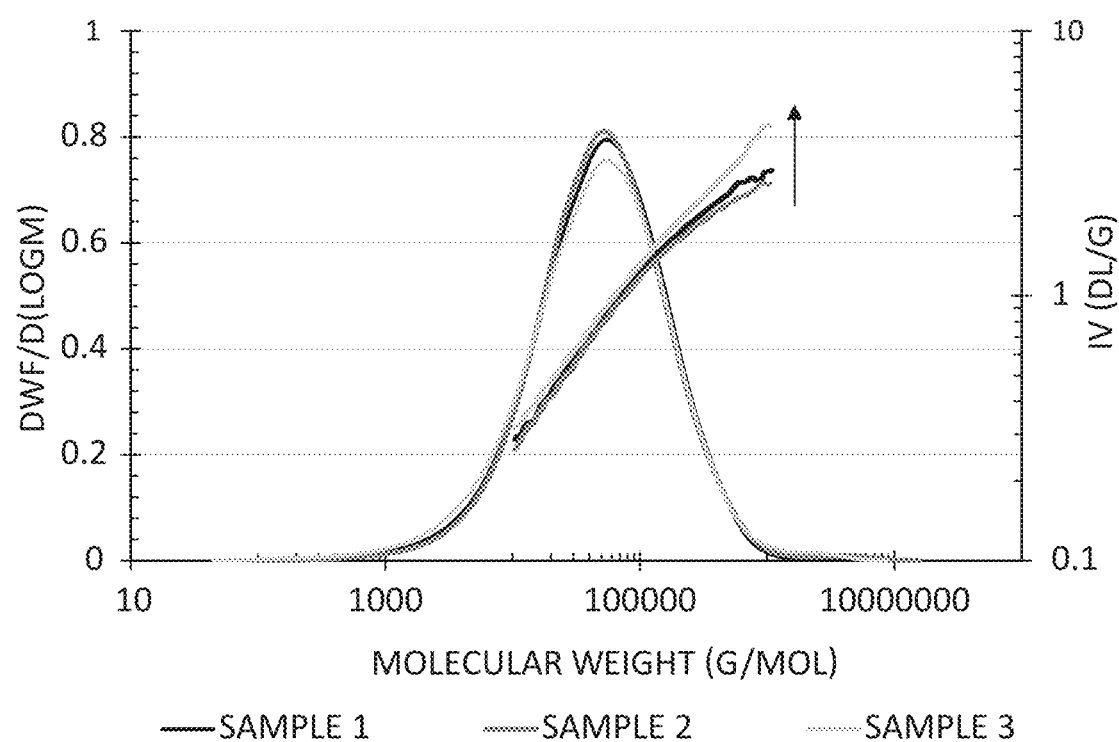
FIG. 10 shows MH Plot and MMD based on viscometer and universal calibration, for Samples 1, 2, and 3.

The MH plot slope $\alpha_2$ increases with the addition of PE in EVA. MH plot slope is well known to be related with the amount of LCB and its increase indicates a reduction of LCB. FIG. 10 shows a comparison among Samples 1, 2, and 3. It is possible to observe that the reduction of VA on EVA samples does not reduce the LCB, but the addition of PE linearizes MH plot in the LCB rich region, increasing the slope of MH plot.

Figure 11:
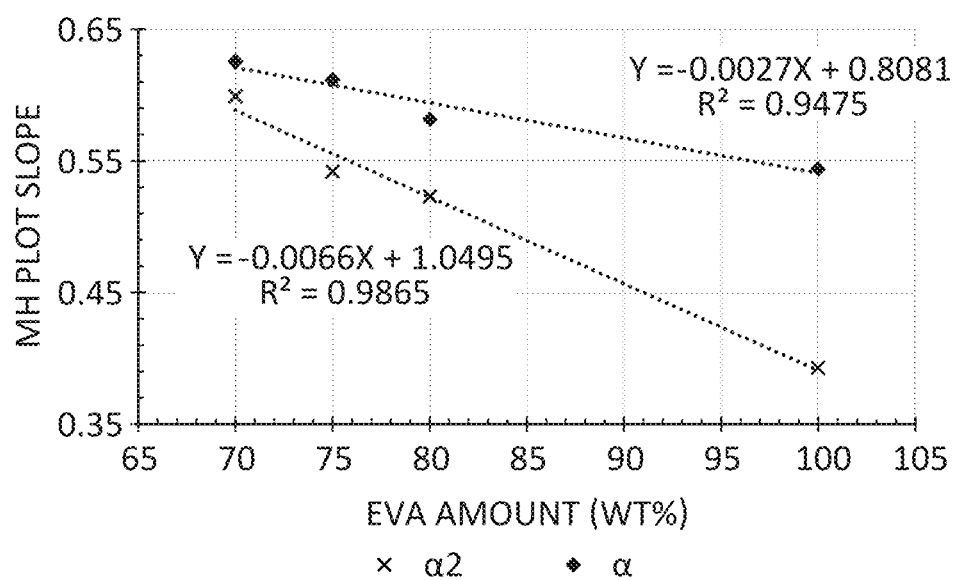
FIG. 11 shows a correlation between MH plot slope and the composition of the blend.

FIG. 11 shows a gradual increase in $\alpha_2/\alpha_1$ as the amount of HDPE increases on the blend. This increase indicates a lower degree of modification by means of long chain branching with the addition of HDPE in the blend. $\alpha_2$ become closer to $\alpha_1$ where minimal effects of SCBD along MW are compensated.

Figure 12:
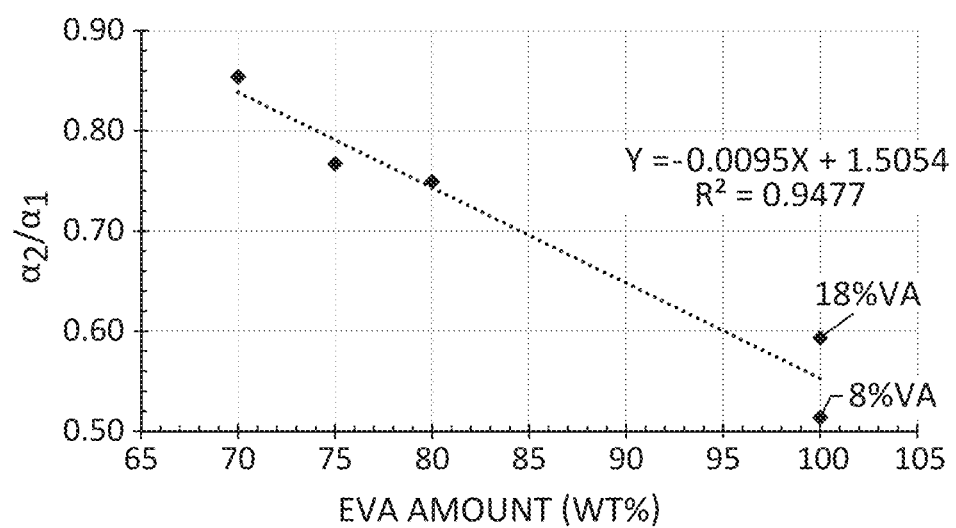
FIG. 12 shows a correlation between MH plot slope and the composition of the blend.

FIG. 12 shows a gradual increase of PE content in the blend, which correlate to an increase in the linearity of the slope of the MH plot. Splitting the MH plot in two distinct regions shows the region rich in LCB, showing a more evident dependence between MH plot slope and EVA content and then, differentiating better the samples.

Figure 13:
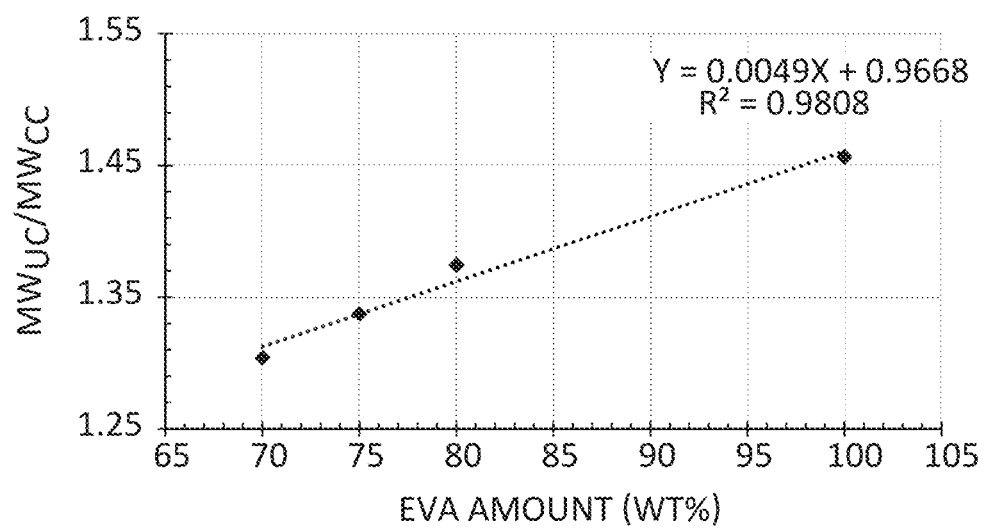
FIG. 13 shows a relationship between Mw ratio $Mw_{UC}/Mw_{CC}$ and the blend composition.

FIG. 13 shows is possible to observe that along the entire range of blend composition, the ratio of $Mw_{UC}/Mw_{CC}$ is higher than one, indicating the presence of some branches in the blend. Although, the addition of PE to EVA reduces the total amount of branch in the blend, which can be confirmed by the continuous decrease in the ratio of $Mw_{UC}/Mw_{CC}$ as the content of PE in the blend increases.

What is claimed is:

1. An additive-manufacture feedstock, comprising
an ethylene-vinyl ester polymer, the ethylene-vinyl ester polymer having:
a melt flow rate of from 0.1 to 150 g/10 min (190° C./2.16 kg), measured according to ASTM D 1238, and
a vinyl ester content of from 1.0 to 30 wt %, relative to 100 wt % of the ethylene-vinyl ester polymer,
wherein the ethylene-vinyl ester polymer exhibits a Shore A hardness of at least 60, and
wherein the ethylene-vinyl ester polymer, in neat form, has an elastic modulus of from 10 to 1500 MPa, measured according to ASTM D 638, and/or a melt viscosity of from 100 to 1000 Pa·s, measured at a shear rate of 1000 s$^{-1}$.

2. The additive-manufacture feedstock according to claim 1, wherein the ethylene-vinyl ester polymer comprises at least one member selected from the group consisting of a tubular-reactor-polymerized ethylene-vinyl acetate copolymer, an autoclave-reactor-polymerized ethylene-vinyl acetate copolymer, and an ethylene-vinyl acetate-vinyl versatate terpolymer.

3. The additive-manufacture feedstock according to claim 1, wherein the vinyl ester of the ethylene-vinyl ester polymer is vinyl acetate.

4. The additive-manufacture feedstock according to claim 3, wherein the vinyl acetate content is from 5.5 to 20 wt %, relative to 100 wt % of the ethylene-vinyl acetate polymer.

5. The additive-manufacture feedstock according to claim 1, wherein the ethylene-vinyl ester polymer has a melt flow rate of from 0.1 to 50 g/10 min (190° C./2.16 kg), measured according to ASTM D 1238.

6. The additive-manufacture feedstock according to claim 1, wherein the ethylene-vinyl ester polymer has a melt flow rate of from 0.1 to 20 g/10 min (190° C./2.16 kg), measured according to ASTM D 1238.

7. The additive-manufacture feedstock according to claim 3, wherein the ethylene-vinyl acetate polymer has a melt flow rate of from 2 to 6 g/10 min (190° C./2.16 kg), measured according to ASTM D 1238.

8. The additive-manufacture feedstock according to claim 1, wherein the ethylene-vinyl ester polymer exhibits a Shore A hardness of at least 80.

9. The additive-manufacture feedstock according to claim 1, wherein the ethylene-vinyl ester polymer exhibits a Shore A hardness of at least 90.

10. The additive-manufacture feedstock according to claim 3, wherein the ethylene-vinyl acetate polymer exhibits a melting point of at least 80° C.

11. The additive-manufacture feedstock according to claim 3, wherein the ethylene-vinyl acetate polymer exhibits a melting point of at least 85° C.

12. The additive-manufacture feedstock according to claim 3, wherein the ethylene-vinyl acetate polymer has a melt flow rate of from 0.1 to 20 g/10 min (190° C./2.16 kg), measured according to ASTM D 1238, and exhibits a Shore A hardness of at least 80.

13. The additive-manufacture feedstock according to claim 3, wherein the ethylene-vinyl acetate polymer is prepared by a tubular-reactor polymerization.

14. The additive-manufacture feedstock according to claim 3, wherein the ethylene-vinyl acetate polymer has a linear backbone configuration.

15. The additive-manufacture feedstock according to claim 13, wherein:
the ethylene-vinyl acetate polymer exhibits a Shore A hardness of at least 90; or
the ethylene-vinyl acetate polymer has a vinyl acetate content of from 5.5 to 20 wt %, relative to 100 wt % of the ethylene-vinyl acetate polymer, and a melt flow rate of from 0.1 to 20 g/10 min (190° C./2.16 kg), measured according to ASTM D 1238.

16. The additive-manufacture feedstock according to claim 1, further comprising an additive selected from the group consisting of an antioxidant, a pigment, an inorganic filler, a reinforcement, an adhesion-promoting agent, a biocide, a whitening agent, a nucleating agent, an anti-static agent, an anti-blocking agent, a processing aid, a flame-retardant, a plasticizer, a heat stabilizer, a light stabilizer, a viscosity-modifier, a polyethylene, a polypropylene, an elastomer, a thermoplastic polyurethane, a sizing agent or compatibilizer, a rubber, a thermoplastic hydrocarbon resin, and any combination thereof.

17. The additive-manufacture feedstock according to claim 16, wherein the additive is an inorganic filler comprising at least one member selected from the group consisting of talc, natural fiber, carbon fiber, glass fiber, metal fibers, ceramic fibers, marble dust, cement dust, rice husks, clay, carbon black, feldspar, silica, glass, fumed silica, silicate, calcium silicate, silicic acid powder, glass microspheres, mica, magnesium oxide, antimony oxide, zinc oxide, barium sulfate, wollastonite, alumina, aluminum silicate, titanium oxide, calcium carbonate, and polyhedral oligomeric silsesquioxane.

18. The additive-manufacture feedstock according to claim 16, comprising:
    at least 51% of the ethylene-vinyl ester polymer, and not more than 49% of the additive, relative to 100% of the additive manufacture feedstock.

19. A filament, comprising the additive-manufacture feedstock according to claim 1.

20. The filament according to claim 19, having a length of 0.1 to 50000 meters.

21. The filament according to claim 19, having a diameter of from 1 to 5 mm, ±0.05 mm.

22. The filament according to claim 19, having a diameter of 1.75 mm or 2.85 mm, ±0.05 mm.

23. A distribution of pellets, each pellet comprising the additive-manufacture feedstock according to claim 1.

24. The distribution of pellets according to claim 23, having a count of 5 to 60 pellets per gram of the additive-manufacture feedstock.

25. The distribution of pellets according to claim 23, having a count of 5 to 20 pellets per gram of the additive-manufacture feedstock.

26. The distribution of pellets according to claim 23, having a count of 30 to 60 pellets per gram of the additive-manufacture feedstock.

27. An additive-manufacture feedstock according to claim 1, comprising a $\square_2/\square_1$ value of from 0.5 to 1.

28. A method of three-dimensional printing, the method comprising:
    (1) supplying the additive-manufacture feedstock according to claim 1 to a printing apparatus and forming a hot-melt of the additive-manufacture feedstock;
    (2) depositing the hot-melt of the additive-manufacture feedstock from the printing apparatus on a substrate to form a first deposited printing layer;
    (3) repeating (1) and (2) to deposit a second printing layer on the first printing layer; and
    (4) optionally depositing at least one further printing layer on said second printing layer.

29. The method of three-dimensional printing according to claim 28, wherein the printing apparatus employs a fused filament fabrication method.

30. The method of three-dimensional printing according to claim 28, wherein the printing apparatus employs a pellet extrusion method.

* * * * *